US006608275B1

(12) United States Patent
Nakagawa et al.

(10) Patent No.: US 6,608,275 B1
(45) Date of Patent: Aug. 19, 2003

(54) JUMP CONTROL METHOD AND APPARATUS FOR ELECTRIC

(75) Inventors: Takayuki Nakagawa, Tokyo (JP); Yoshihito Imai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/937,384

(22) PCT Filed: May 15, 2000

(86) PCT No.: PCT/JP00/03097

§ 371 (c)(1), (2), (4) Date: Sep. 25, 2001

(87) PCT Pub. No.: WO01/87527

PCT Pub. Date: Nov. 22, 2001

(51) Int. Cl.[7] .............................. B23H 7/18; B23H 1/02
(52) U.S. Cl. .................................. 219/69.16; 219/69.17
(58) Field of Search ............................ 219/69.16, 69.2, 219/69.17

(56) References Cited

U.S. PATENT DOCUMENTS 4,822,970 A * 4/1989 Levy et al. .............. 219/69.16
5,900,165 A * 5/1999 Taneda .................... 219/69.16
5,973,498 A * 10/1999 Imai et al. ............... 219/69.16

FOREIGN PATENT DOCUMENTS

| | | |
|---|---|---|
| JP | 4-31806 | 5/1992 |
| JP | 5-116031 | 5/1993 |
| JP | 6-126534 A * | 5/1994 |
| JP | 6-250723 | 9/1994 |
| JP | 7-24638 | 1/1995 |
| JP | 7-124821 | 6/1995 |
| JP | 10-309630 A * | 11/1998 |

* cited by examiner

*Primary Examiner*—Geoffrey S. Evans
(74) *Attorney, Agent, or Firm*—Leydig, Voit & Mayer, Ltd.

(57) ABSTRACT

An electric discharge machining device including an interelectrode servo control unit for controlling an interelectrode distance between an electrode and an object while applying a voltage across the electrode and the object, and a jump control unit for controlling a jump operation in which the interelectrode distance is temporarily increased at time intervals or in response to a machining state jump control unit includes a jump locus generation unit for generating a smooth command locus having a frequency component in a frequency range. The jump control unit controls the jump operation by using a smooth command locus generated by the jump locus generation unit.

50 Claims, 15 Drawing Sheets

JUMP LOCUS GENERATION UNIT
1
SWITCHING UNIT SW
MACHINING CONDITION STORAGE UNIT
4
JUMP CONTROL UNIT
2
3
5
MACHINING POWER SUPPLY CONTROL UNIT
10
MACHINING POWER SUPPLY
MAIN SHAFT MOTOR CONTROL UNIT
6
INTERELECTRODE VOLTAGE DETECTION UNIT
7
INTERELECTRODE SERVO CONTROL UNIT
POSITION DETECTION UNIT
8
MAIN SHAFT MOTOR
9
MAIN SHAFT
13
ELECTRODE
11
OBJECT TO BE MACHINED
12

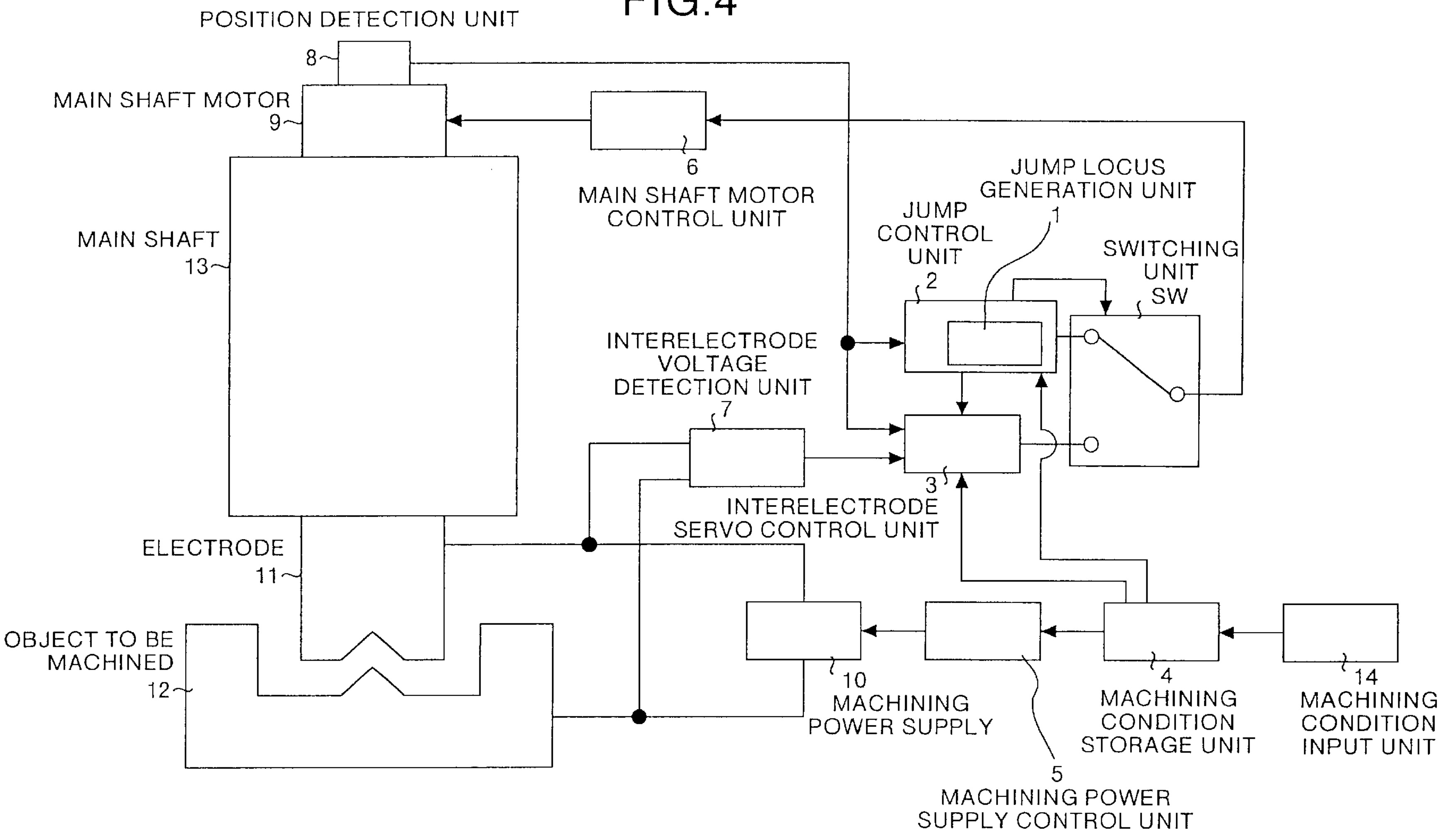
FIG.4
POSITION DETECTION UNIT
8
MAIN SHAFT MOTOR
9
6
MAIN SHAFT MOTOR CONTROL UNIT
MAIN SHAFT
13
JUMP LOCUS GENERATION UNIT
1
JUMP CONTROL UNIT
2
SWITCHING UNIT SW
INTERELECTRODE VOLTAGE DETECTION UNIT
7
3
INTERELECTRODE SERVO CONTROL UNIT
ELECTRODE
11
OBJECT TO BE MACHINED
12
10
MACHINING POWER SUPPLY
4
MACHINING CONDITION STORAGE UNIT
14
MACHINING CONDITION INPUT UNIT
5
MACHINING POWER SUPPLY CONTROL UNIT JUMP LOCUS GENERATION UNIT
1
FILTER
15
SWITCHING UNIT SW
MACHINING CONDITION STORAGE UNIT
4
JUMP CONTROL UNIT
2
3
5
MACHINING POWER SUPPLY CONTROL UNIT
INTERELECTRODE SERVO CONTROL UNIT
10
MACHINING POWER SUPPLY
MAIN SHAFT MOTOR CONTROL UNIT
6
INTERELECTRODE VOLTAGE DETECTION UNIT
7
POSITION DETECTION UNIT
8
MAIN SHAFT MOTOR
9
MAIN SHAFT
13
ELECTRODE
11
OBJECT TO BE MACHINED
12

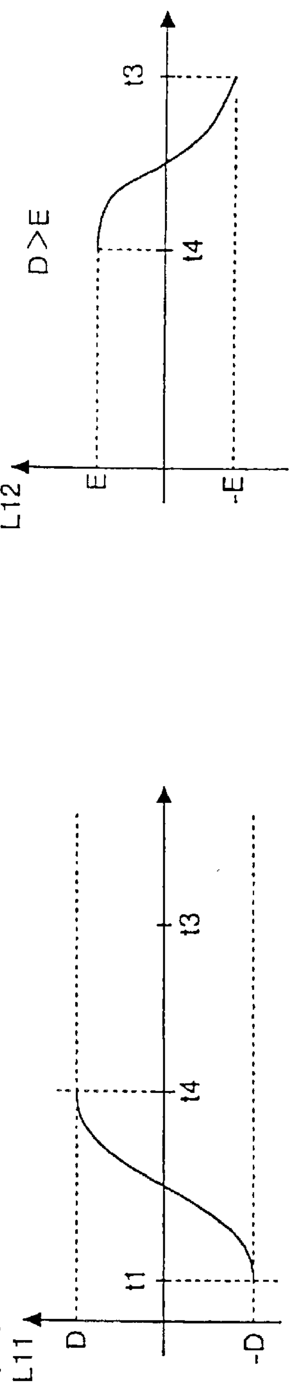
FIG. 10(a)
FIG. 10(c)
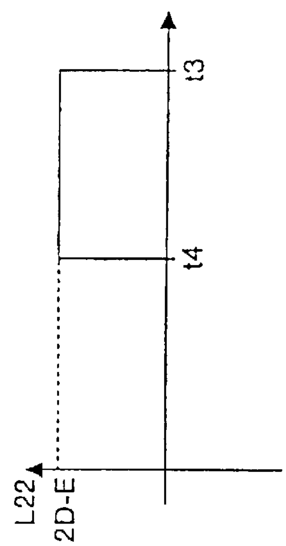
FIG. 10(d)
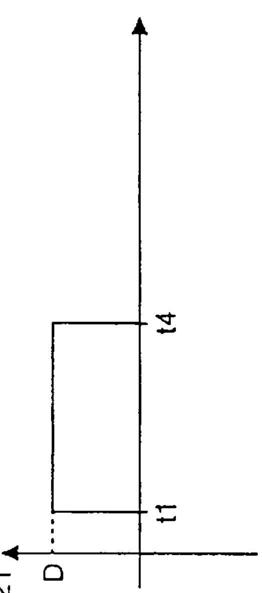
FIG. 10(b)
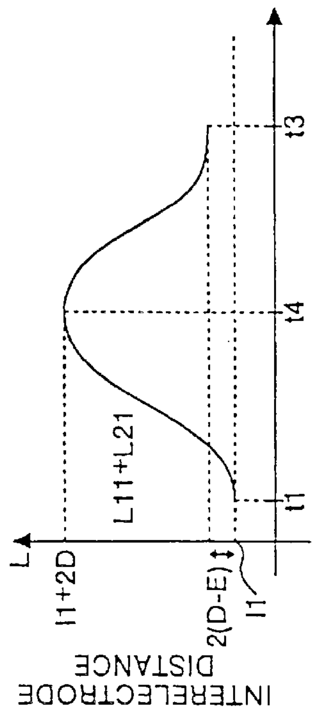
FIG. 10(e)

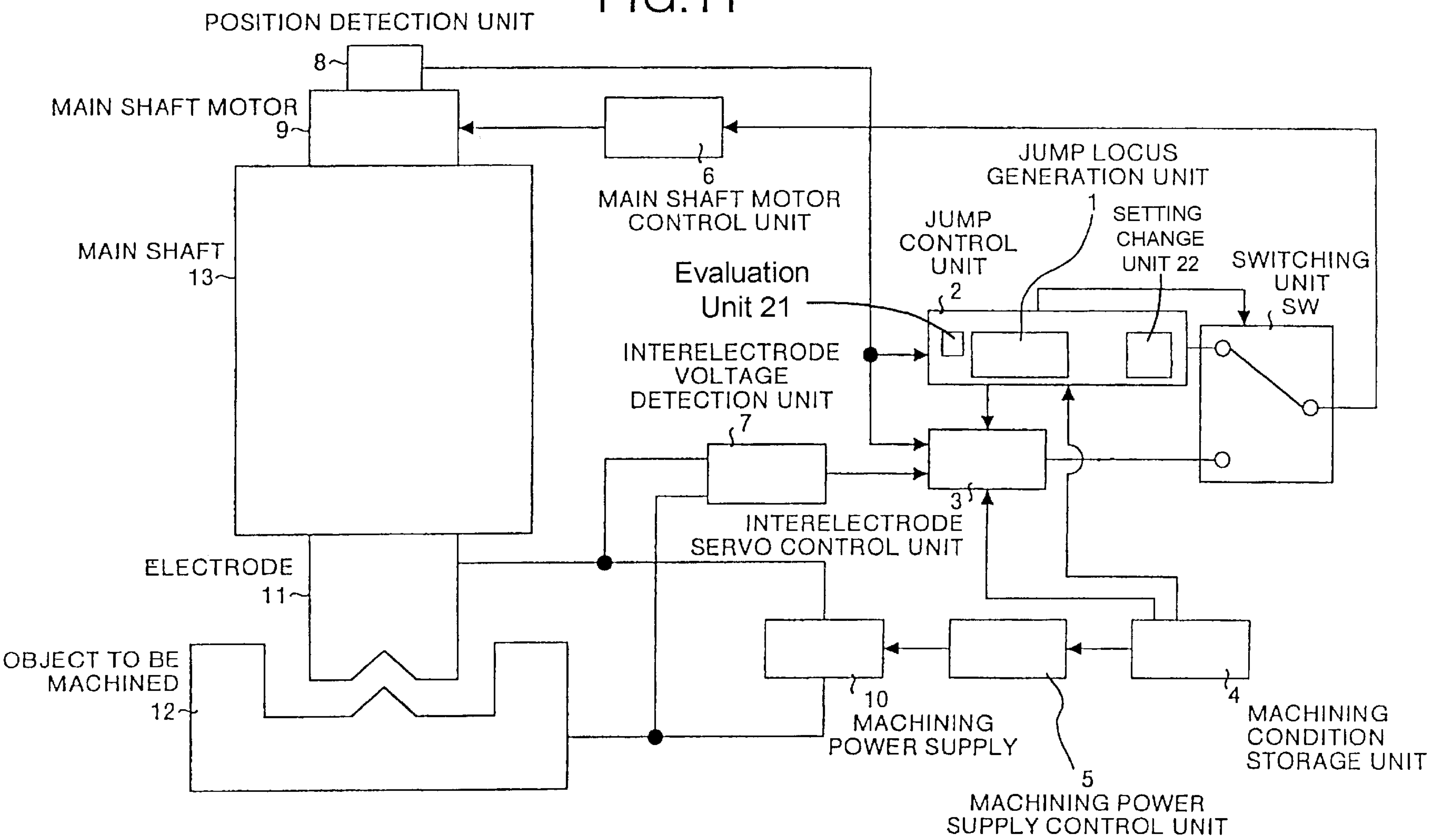
FIG.11
POSITION DETECTION UNIT
8
MAIN SHAFT MOTOR
9
MAIN SHAFT
13
ELECTRODE
11
OBJECT TO BE MACHINED
12
6
MAIN SHAFT MOTOR CONTROL UNIT
Evaluation Unit 21
INTERELECTRODE VOLTAGE DETECTION UNIT
7
INTERELECTRODE SERVO CONTROL UNIT
3
JUMP CONTROL UNIT
2
JUMP LOCUS GENERATION UNIT
1
SETTING CHANGE UNIT 22
SWITCHING UNIT SW
4
MACHINING CONDITION STORAGE UNIT
5
MACHINING POWER SUPPLY CONTROL UNIT
10
MACHINING POWER SUPPLY ACCELERATION
a1
a4
-a3
-a2
TIME
TA1
TA2
TA3
TA4
TA5
TA6
TA7
TA8
TA9
TA10
TA11
TA12
TA13
TA14
TA15
TA16
INTEGRATION

SPEED
V
-V2
-V1
TIME
INTEGRATION

INTERELECTRODE DISTANCE
I2
I3
I1
0
TIME

POSITION DETECTION UNIT
8
MAIN SHAFT MOTOR
9
MAIN SHAFT
13
ELECTRODE
11
OBJECT TO BE MACHINED
12
MAIN SHAFT MOTOR CONTROL UNIT
6
INTERELECTRODE VOLTAGE DETECTION UNIT
7
INTERELECTRODE SERVO CONTROL UNIT
3
JUMP CONTROL UNIT
102
JUMP LOCUS GENERATION UNIT
101
SWITCHING UNIT
SW10
MACHINING CONDITION STORAGE UNIT
4
MACHINING POWER SUPPLY CONTROL UNIT
5
MACHINING POWER SUPPLY
10

JUMP CONTROL METHOD AND APPARATUS FOR ELECTRIC

TECHNICAL FIELD

The present invention relates to a technology for machining an object by generating an electric discharge between the object and an electrode. More particularly, this invention relates to a technology for controlling a jump operation in which distance between the object and the electrode is temporarily increased at each of predetermined times or depending on the machining state.

BACKGROUND ART

Conventionally, an electric discharge machining device performs a jump operation. This jump operation is an operation in which distance between the object and the electrode ("interelectrode distance") is temporarily increased at each of predetermined times or depending on the machining state. Machining waste deposited between the electrode and the object can be removed efficiently because of this jump operation. Moreover, speed or precision of electric discharge machining can be improved.

FIG. 14 is a block diagram showing the configuration of a conventional electric discharge machining device. Moreover, FIGS. 15(*a*)–15(*d*) are time charts for explaining a jump operation performed by the conventional electric discharge machining device. FIG. 15(*a*) is a time chart showing a change in interelectrode distance in the jump operation, FIG. 15(*b*) is a time chart showing a change in speed in the jump operation, FIG. 15(*c*) is a time chart showing a change in acceleration in the jump operation, and FIG. 15(*d*) is a graph showing a result of Fourier transform of the time chart in FIG. 15(*a*).

Referring to FIG. 14, the interelectrode voltage detection unit 7 detects a voltage between the electrode 11 and the object 12 ("interelectrode voltage"). The interelectrode servo control unit 3 controls the position of the main shaft 13 according to the detected interelectrode voltage. Moreover, the interelectrode servo control unit 3 performs electric discharge machining of the object 12 by using an electric discharge phenomenon. The jump control unit 102 controls temporarily increasing the interelectrode distance at each of predetermined times or depending on the machining state. Whether machining by the interelectrode servo control unit 3 is to be performed or a jump operation by the jump control unit 102 is to be performed can be selected with the switching unit SW10. When the jump control unit 102 performs a jump operation, the jump control unit 102 notifies the interelectrode servo control unit 3 the jump operation is to be performed, and switches the switching unit SW10 from the interelectrode servo control unit 3 to the jump control unit 102.

The jump operation will be described below with reference to FIGS. 15(*a*)–15(*d*). The jump control unit 102 starts the jump operation at a point of time at which a predetermined time has elapsed or a point of time t1 at which a predetermined machining state is set. In the jump operation, the electrode 11 is raised at a speed V1 until the interelectrode distance changes from a distance l1 to a distance l2. At a point of time t2 at which the interelectrode distance is distance l2, the electrode 11 is switched from an up state to a down state to move the electrode 11 downward at a speed −V1. At a point of time at which the interelectrode distance is a distance l3, the speed −V1 of the of the electrode 11 is changed into the speed −V2, and the electrode 11 is reduced in speed, and the interelectrode distance returns to the distance l1. At the point of time t3, the speed −V1 is reduced to the speed −V2 because the electrode 11 may collide with the object to be machined 12 by inertia of the electrode 11 when the electrode 11 is moved downward at the speed −V1.

In this conventional electric discharge machining device, since the speed is sharply changed at the points of time t1, t2, and t3, the response of a mechanical control system is delayed, or a target is overshot. In addition, since the locus of the interelectrode distance is a locus containing a high-frequency component, a resonance of the mechanical system is excited, and vibration remains after the jump operation is completed. In this case, since the electric discharge machining is performed by applying a voltage across the electrodes in a state in which the interelectrode distance between the electrode 11 and the object to be machined 12 is kept at several μm to tens of μm, a problem that machining precision or speed is considerably decreased by slight residual vibration is posed.

Moreover, conventionally, a deceleration distance (l3–l1) may be increased to prevent machining precision from being degraded by the influence of residual vibration or the overshooting of the shaft. However, in this case, it takes long time to perform the jump operation, and a problem that the entire machining time is extended is posed.

More specifically, a jump operation performed by the conventional electric discharge machining device has a problem in machining precision or machining speed is considerably decreased depending on a setting of residual vibration or deceleration distance because speed or acceleration is sharply changed.

In fact, with respect to the object 12 to be machined and the electrode 11, an optimum set frequency and the allowable maximum component value of the frequency in the jump operation change, depending on the mass of the electric discharge machining device, a machining condition, aging of the electric discharge machining device, and the like. In this case, when these two elements are adjusted, the machining time is shortened, and the machining precision can be increased. It is hard for an operator of the electric discharge machining device to adjust the set frequency and the allowable maximum component value optimally.

DISCLOSURE OF THE INVENTION

This invention has been made to solve the above problems, and has as its object to obtain an electric discharge machining device and an electric discharge machining method which can shorten machining time and which can improve a machining precision.

In order to solve the this problem, the electric discharge machining device according to this invention comprises an interelectrode servo control unit which controls an interelectrode distance which is a distance between an electrode and an object to be machined while applying a predetermined voltage across the electrode and the object; and a jump control unit which controls a jump operation in which the interelectrode distance is temporarily increased at every predetermined time or depending on a machining state. The jump control unit includes a command locus generation unit which generates a smooth command locus having a frequency component in a predetermined frequency range which is not higher than a predetermined frequency or lower than the predetermined frequency. The jump control unit controls the jump operation by using a smooth command locus generated by the command locus generation unit. For example, since the command locus generation unit is designed to generate a command locus by using a sine wave having a low-frequency component which is lower than a resonance frequency of a mechanical system, vibration of the mechanical system does not remain upon completion of the jump operation, and precise machining can be performed.

The electric discharge machining device according to another invention comprises an interelectrode servo control unit which controls an interelectrode distance which is a distance between an electrode and an object while applying a predetermined voltage across the electrode and the object; and a jump control unit which controls a jump operation in which the interelectrode distance is temporarily increased at every predetermined time or depending on a machining state. The jump control unit includes a command locus generation unit which generates a smooth command locus having a frequency component in a predetermined frequency range except for a frequency range of a first frequency which is lower than a predetermined frequency to a second frequency which is higher than the predetermined frequency. The jump control unit controls the jump operation by using the smooth command locus generated by the command locus generation unit. For example, since the command locus generation unit is designed to generate a command locus by using a sine wave having a frequency component sufficiently different from a resonance frequency of a mechanical system, vibration of the mechanical system does not remain upon completion of the jump operation, and precise machining can be performed.

The electric discharge machining device according to still another invention comprises an interelectrode servo control unit which controls an interelectrode distance which is a distance between an electrode and an object while applying a predetermined voltage across the electrode and the object; and a jump control unit which controls a jump operation in which the interelectrode distance is temporarily increased at every predetermined time or depending on a machining state. The jump control unit includes a command locus generation unit which generates a smooth command locus in which a value of a frequency component in a predetermined frequency range which is not lower than a predetermined frequency or higher than the predetermined frequency is suppressed to a value which is not larger than a predetermined value or smaller than the predetermined value. The jump control unit controls the jump operation by using the smooth command locus generated by the command locus generation unit. For example, since the command locus generation unit is designed to generate a smooth command locus in which a high frequency component which is higher than a resonance frequency of a mechanical system is suppressed to a value which is not larger than a predetermined value, vibration of the mechanical system does not remain upon completion of the jump operation, precise machining can be performed, and a deceleration distance of the electrode can be decreased by decreasing vibration and decreasing an amount of overshooting. As a result, time required for the entire jump operation can be shortened, and machining speed can be increased.

The electric discharge machining device according to still another invention comprises an interelectrode servo control unit which controls an interelectrode distance which is a distance between an electrode and an object while applying a predetermined voltage across the electrode and the object; and a jump control unit which controls a jump operation in which the interelectrode distance is temporarily increased at every predetermined time or depending on a machining state. The jump control unit includes a command locus generation unit which generates a smooth command locus in which a value of a frequency component in a predetermined frequency range of a first frequency which is lower than a predetermined frequency to a second frequency which is higher than the predetermined frequency is suppressed to a value which is not larger than a predetermined value or smaller than the predetermined value. The jump control unit controls the jump operation by using the smooth command locus generated by the command locus generation unit. For example, since the command locus generation unit is designed to generate a smooth command locus in which a value of a frequency component approximate to a resonance frequency of a mechanical system, vibration of the mechanical system does not remain upon completion of the jump operation, and precise machining can be performed.

In the electric discharge machining device according to the above invention, the jump control unit further includes a filter, and the filter shapes a locus into a smooth locus in which the value of the frequency component in the predetermined frequency range is suppressed to a value which is not larger than the predetermined value or smaller than the predetermined value. For example, since an analog filter is arranged as the filter to generate a smooth command locus in which a high frequency component which is higher than a resonance frequency of a mechanical system is suppressed to a value which is not larger than a predetermined value, vibration of the mechanical system does not remain upon completion of the jump operation, and precise machining can be performed. An deceleration distance of the electrode can be shortened by reducing vibration and reducing an amount of overshooting. As a result, time required for the entire jump operation can be shortened, and machining speed can be increased.

In the electric discharge machining device according to the above invention, the command locus generation unit adds a plurality of loci in each of which the value of the frequency component in the predetermined frequency range is suppressed to a value which is not larger than a predetermined value or smaller than the predetermined value to each other to generate the smooth command locus which is suppressed to the value which is not larger than the predetermined value or smaller than the predetermined value. In this manner, vibration of a mechanical system does not remain upon completion of the jump operation, and precise machining can be performed.

The electric discharge machining device according to the above invention further includes a storage unit which stores condition information of the jump operation including the predetermined frequency range or the predetermined frequency range and the predetermined value, and the command locus generation unit is designed to generate the smooth command locus on the basis of the predetermined frequency range or the predetermined frequency range and the predetermined value, so that the jump operation can be flexibly changed and set.

The electric discharge machining device according to the above invention further includes setting input unit which inputs values of the predetermined frequency range or at least one of the predetermined frequency range and the predetermined value, and the command locus generation unit generates the smooth command locus on the basis of the predetermined frequency range or the predetermined frequency and the predetermined value set by the setting input unit. In this manner, vibration of a mechanical system does not remain upon completion of the jump operation, so that precise machining can be easily set.

In the electric discharge machining device according to the above invention, the jump control unit further includes a jump operation evaluation unit which detects a state in the jump operation to evaluate the jump operation, and a setting change unit which changes the set values of the predetermined frequency range, the predetermined value, or the predetermined frequency range and the predetermined value on the basis of an evaluation result obtained by the jump operation evaluation unit. In this manner, the jump operation evaluation unit evaluates an actual motion of the electrode, and the setting change unit automatically change a setting on the basis of the evaluation result to obtain an optimum machining condition such as the predetermined frequency range or the predetermined value. For this reason, machining at a high speed and a high precision can be automatically performed.

In the electric discharge machining device according to the above invention, the command locus generation unit generates a predetermined function which satisfies the predetermined frequency range or the predetermined frequency range and the predetermined value and which corresponds to the jump operation, and performs at least one integrating processor at least one differential process to the predetermined function to generate the command locus or a control command corresponding to the command locus. In this manner, vibration of a mechanical system does not remain upon completion of the jump operation, and precise machining can be performed. Moreover, deceleration distance of the electrode can be shortened by reducing vibration and reducing an amount of overshooting. As a result, time required for the entire jump operation can be shortened, and machining speed can be increased.

In the electric discharge machining device according to the above invention, the jump control unit controls the jump operation on the basis of a command speed or a command acceleration corresponding to the smooth command locus. In this manner, flexible electric discharge machining can be performed at a high speed and high precision.

The electric discharge machining method according to still another invention in which an interelectrode servo control unit controls an interelectrode distance which is a distance between an electrode and an object while applying a predetermined voltage across the electrode and the object and a jump control unit controls a jump operation temporarily increases the interelectrode distance every predetermined time or depending on a machining state. The method comprises the command locus generation step of generating a smooth command locus having a frequency component in a predetermined frequency range which is not higher than a predetermined frequency or lower than the predetermined frequency, and the jump operation control step of controlling the jump operation by using a smooth command locus generated by the command locus generation step. For example, since the command locus generation step is designed to generate a command locus by using a sine wave having a low-frequency component which is lower than a resonance frequency of a mechanical system, vibration of the mechanical system does not remain upon completion of the jump operation, and precise machining can be performed.

The electric discharge machining method according to still another invention in which an interelectrode servo control unit controls an interelectrode distance which is a distance between an electrode and an object while applying a predetermined voltage across the electrode and the object and a jump control unit controls a jump operation temporarily increases the interelectrode distance every predetermined time or depending on a machining state. The method comprises the command locus generation step of generating a smooth command locus having a frequency component in a predetermined frequency range except for a frequency range of a first frequency which is lower than a predetermined frequency to a second frequency which is higher than the predetermined frequency, and the jump operation control step of controlling the jump operation by using the smooth command locus generated by the command locus generation step. For example, since the command locus generation step is designed to generate a command locus by using a sine wave having a frequency component sufficiently different from a resonance frequency of a mechanical system, vibration of the mechanical system does not remain upon completion of the jump operation, and precise machining can be performed.

The electric discharge machining method according to still another invention in which an interelectrode servo control unit controls an interelectrode distance which is a distance between an electrode and an object while applying a predetermined voltage across the electrode and the object and a jump control unit controls a jump operation temporarily increases the interelectrode distance every predetermined time or depending on a machining state. The method comprises the command locus generation step of generating a smooth command locus in which a value of a frequency component in a predetermined frequency range which is not lower than a predetermined frequency or higher than the predetermined frequency is suppressed to a value which is not larger than a predetermined value or smaller than the predetermined value, and the jump control step of controlling the jump operation by using the smooth command locus generated by the command locus generation step. For example, since the command locus generation step is designed to generate a smooth command locus in which a value of frequency component approximate to a resonance frequency of a mechanical system is suppressed to a value which is not larger than a predetermined value, vibration of the mechanical system does not remain upon completion of the jump operation, precise machining can be performed.

In the electric discharge machining method according to the above invention, the command locus generation step includes the addition step of adding a plurality of loci in each of which the value of the frequency component in the predetermined frequency range is suppressed to a value which is not larger than a predetermined value or smaller than the predetermined value to each other, and the generation step of generating the smooth command locus which is suppressed to the value which is not larger than the predetermined value or smaller than the predetermined value on the basis of the loci added by the addition step. In this manner, vibration of a mechanical system does not remain upon completion of the jump operation, and precise machining can be performed.

The electric discharge machining method according to the above invention further includes the setting input step of inputting a setting of the predetermined frequency range or at least one of the predetermined frequency range and the predetermined value, and the command locus generation step generates the smooth command locus on the basis of the predetermined frequency range or the predetermined frequency and the predetermined value set by the setting input step. In this manner, vibration of a mechanical system does not remain upon completion of the jump operation, so that precise machining can be easily set.

The electric discharge machining method according to the above invention further includes the jump operation evaluation step of detecting a state in the jump operation to evaluate the jump operation, and the setting change step of changing a setting of the predetermined frequency range, the predetermined value, or the predetermined frequency range and the predetermined value on the basis of an evaluation result obtained by the jump operation evaluation step. In this manner, the jump operation evaluation step evaluates an actual motion of the electrode, and the setting change step automatically change a setting on the basis of the evaluation result to obtain an optimum machining condition such as the predetermined frequency range or the predetermined value. For this reason, machining at a high speed and a high precision can be automatically performed.

In the electric discharge machining method according to the above invention, the command locus generation step generates a predetermined function which satisfies the predetermined frequency range or the predetermined frequency range and the predetermined value and which corresponds to the jump operation, and performs at least one integrating processor at least one differential process to the predetermined function to generate the command locus or a control command corresponding to the command locus. In this manner, vibration of a mechanical system does not remain upon completion of the jump operation, and precise machining can be performed. Moreover, deceleration distance of the electrode can be shortened by reducing vibration and reducing an amount of overshooting. As a result, time required for the entire jump operation can be shortened, and machining speed can be increased.

In the electric discharge machining device according to the above invention, the jump operation control step controls the jump operation on the basis of a command speed or a command acceleration corresponding to the smooth command locus. In this manner, flexible electric discharge machining can be performed at a high speed and a high precision.

BRIEF DESCRIPTION OF THE DRAWINGS

FIG. 4 is a block diagram showing the configuration of an electric discharge machining device according to a third embodiment of the present invention;

FIGS. 10(*a*)–10(*d*) are graphs showing an example of a command locus which is a modification of the seventh embodiment of the present invention;

FIG. 11 is a block diagram showing the configuration of an electric discharge machining device according to a eighth embodiment of the present invention;

BEST MODE FOR CARRYING OUT THE INVENTION

Embodiments of an electric discharge machining device and an electric discharge machining method according to the present invention will be described below with reference to the accompanying drawings.

Figure 1:
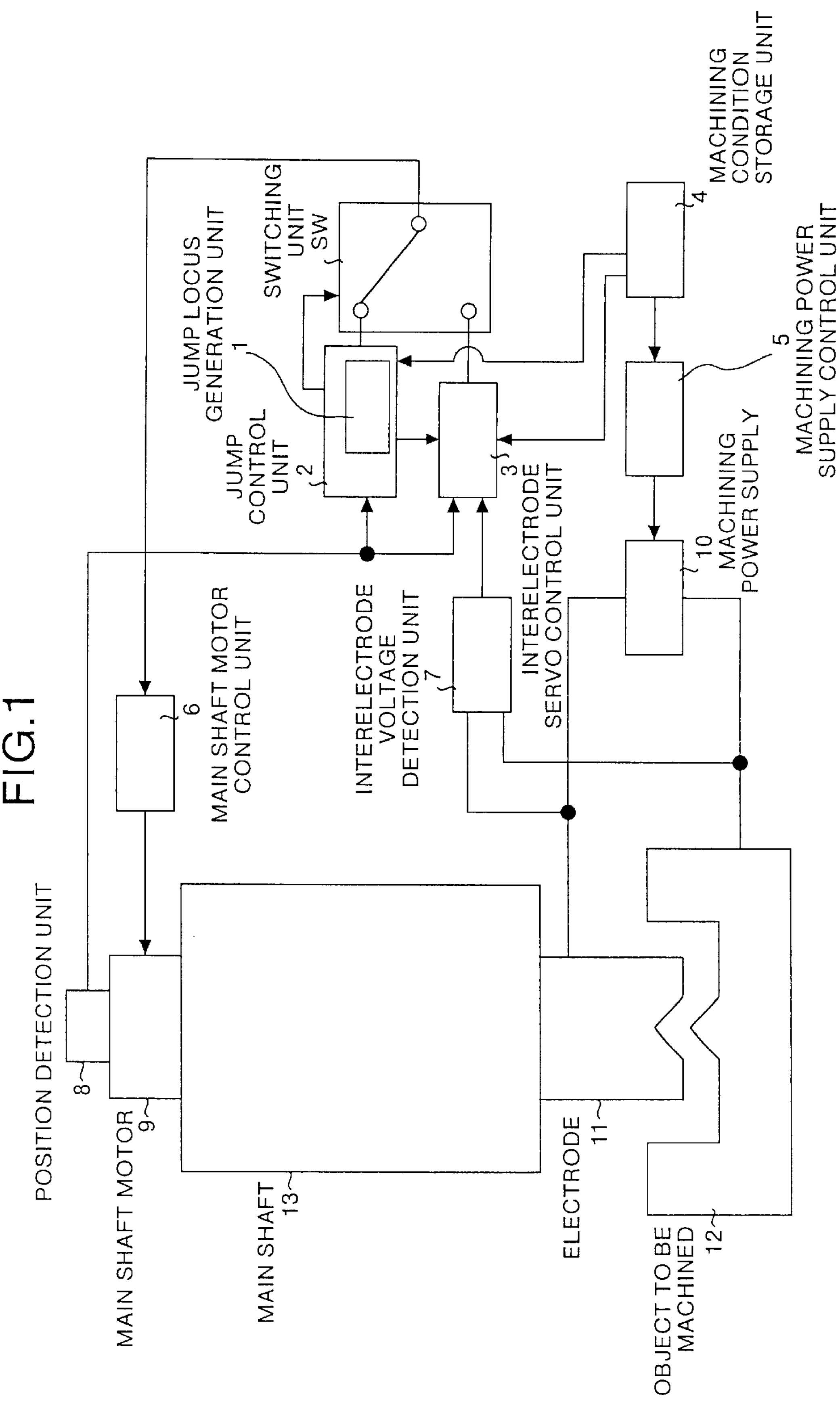
FIG. 1 is a block diagram showing the configuration of an electric discharge machining device according to a first embodiment of the present invention.

A first embodiment of the present invention will be described below. FIG. 1 shows a block diagram of the configuration of an electric discharge machining device according to the first embodiment of the present invention. Referring to FIG. 1, a machining power supply control unit 5 controls a machining power supply 10 on the basis of information stored in a machining condition storage unit 4 and related to machining power supply control to apply a voltage across an electrode 11 and an object 12.

An interelectrode servo control unit 3 controls an interelectrode distance between an interelectrode voltage detection result of an interelectrode voltage detection unit 7 for detecting an interelectrode voltage between the electrode 11 and the object 12 and a position detection result of the electrode 11 obtained by a position detection unit 8. The interelectrode servo control unit 3 controls a main shaft motor control unit 6, drives a main shaft motor 9 on the basis of this control, and vertically moves the position of a main shaft 13 to move the electrode 11. As a result, an interelectrode distance between the electrode 11 and the object 12 is controlled. The interelectrode servo control unit 3 performs control on the basis of a servo control condition stored in the machining condition storage unit 4.

On the other hand, a jump control unit 2 controls a jump operation for temporarily largely jumping the interelectrode distance every predetermined time or depending on a machining state on the basis of jump operation condition information stored in the machining condition storage unit 4. The jump control unit 2 controls the interelectrode distance between the electrode 11 and the object 12 through the main shaft motor control unit 6, the main shaft motor 9 and the main shaft 13 like the control of the interelectrode distance by the interelectrode servo control unit 3. In this case, the jump control unit 2 controls the interelectrode distance on the basis of a position detection result of the position detection unit 8 for detecting the position of the electrode 11.

Switching between the control by the interelectrode servo control unit 3 and the control by the jump control unit 2 is performed by a switching unit SW. When the jump control unit 2 performs a jump operation, the jump control unit 2 notifies the interelectrode servo control unit 3 that the jump operation is performed, and controls the switching unit SW to switch the control from the interelectrode servo control unit 3 to the jump control unit 2.

Figure 2:
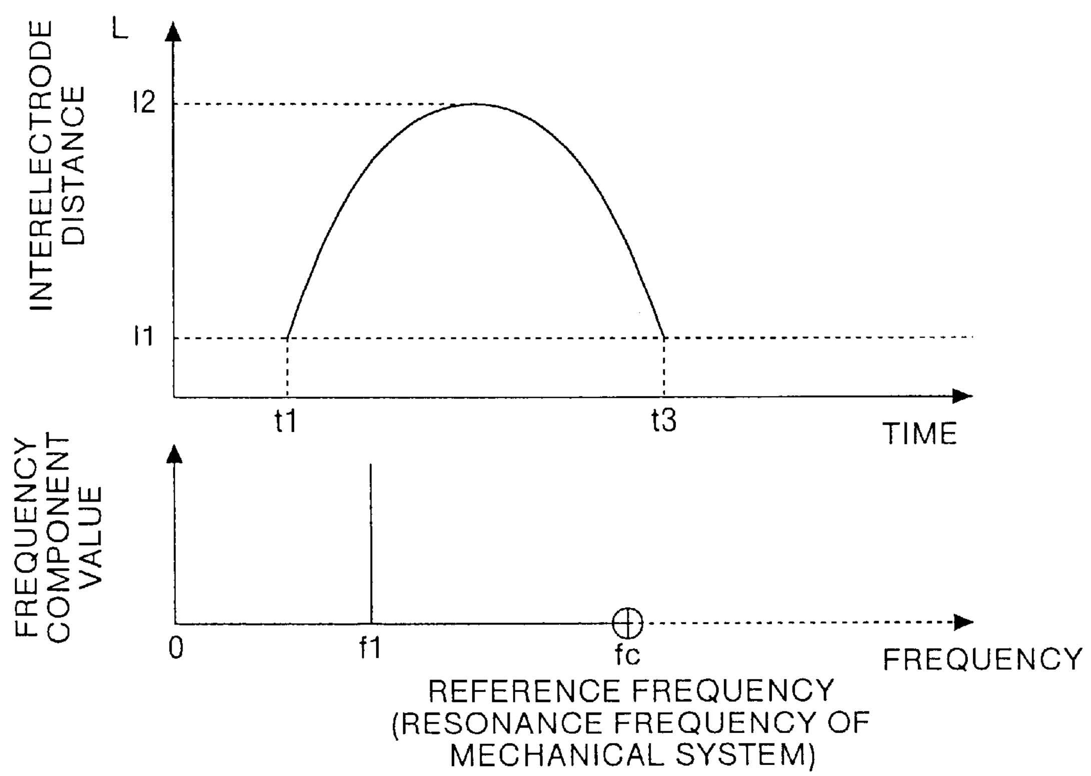
FIG. 2 is a graph showing an example of a command locus generated by a jump locus generation unit of the electric discharge machining device according to the first embodiment of the present invention.

The jump control unit 2 has a jump locus generation unit 1. The jump locus generation unit 1 generates a command locus of an interelectrode distance shown in FIG. 2(*a*) on the basis of jump operation condition information stored in the machining condition storage unit 4, and the jump control unit 2 controls the jump operation on the basis of the command locus. FIG. 2(*b*) shows a Fourier transform result of the command locus shown in FIG. 2(*a*).

As the command locus of the jump operation shown in FIG. 2, a locus generated by a sine wave of a low frequency f which is lower than a reference frequency fc is used. In this case, when the interelectrode distance is represented by "L(t)", the interelectrode distance can be expressed by:

$$L(t)=(l2-l1)\sin 2\pi f1(t-t1)+l1,$$

where f<fc. In this equation "f1" represents a frequency component of a command locus. In addition, "l1" represents an interelectrode distance at a jump operation start point t1 and a jump operation end point t2, and "l2" represents the maximum value of an interelectrode distance in the jump operation. As the reference frequency fc, a resonance frequency of an electric discharge machining device (mechanical system) is used.

The equation of the interelectrode distance L(t) is stored in the machining condition storage unit 4. The jump locus generation unit 1 generates a command locus from the machining condition storage unit 4 on the basis of the equation of the interelectrode distance L(t), and the jump control unit 2 controls a jump operation on the basis of the command locus.

In the first embodiment, since the jump locus generation unit 1 generates a smooth command locus obtained by a sine wave of only a component of a frequency f1 which is lower than the resonance frequency fc, vibration in a mechanical system does not remain upon completion of the jump operation, and precise machining can be performed.

In the first embodiment, the command locus is generated by a sine wave of only a component of one frequency f1 which is lower than the reference frequency fc. However, the frequency f1 may be equal to or lower than the reference frequency fc, and a command locus including at least two frequency components which are lower than the reference frequency fc may be generated.

In the first embodiment, a resonance frequency of the mechanical system is used as the reference frequency fc. However, a cut-off frequency calculated by frequency response of a control system, ½ of a sampling frequency of a digital controller, or a reference frequency for setting these frequencies, e.g., a frequency which is A times (0<A<1) of the cut-off frequency may be used.

In the first embodiment, a jump operation is performed such that a command locus, i.e., the position of the interelectrode distance is controlled. However, the interelectrode distance may be controlled by speed control or acceleration control.

A second embodiment of the present invention will be described below. The configuration of an electric discharge machining device according to this second embodiment is same as that of the electric discharge machining device shown in FIG. 1 except for an equation of an interelectrode distance "L(t)" stored by a machining condition storage unit 4 and a generation process of a command locus performed by a jump locus generation unit 1.

Figure 3:
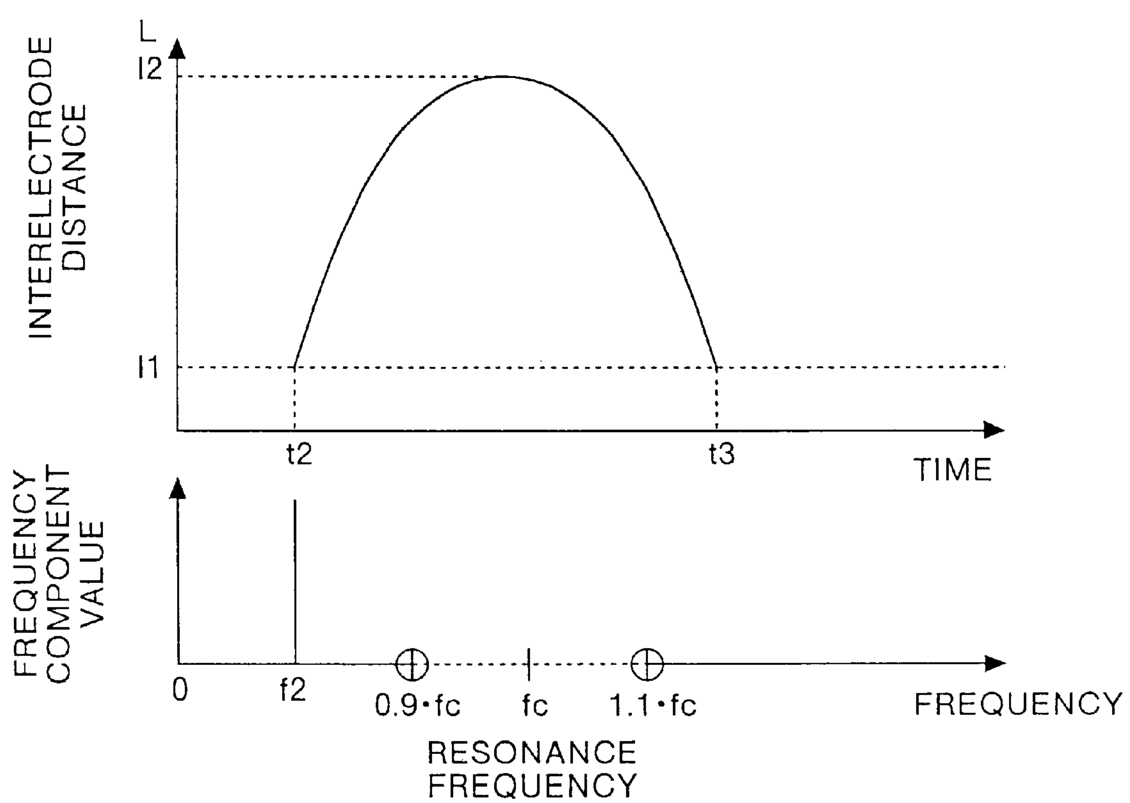
FIG. 3 is a graph showing an example of a command locus generated by a jump locus generation unit of an electric discharge machining device according to a second embodiment of the present invention.

FIG. 3 is a graph showing a command locus of a jump operation generated by the jump locus generation unit 1 of the electric discharge machining device according to the second embodiment of the present invention and a Fourier transform result of the command locus. The command locus of the jump operation shown in FIG. 3 is generated by a sine wave having a frequency component except for frequencies ranging from a frequency which is 0.9 times an reference frequency fc to a frequency which is 1.1 times the reference frequency fc. More specifically, the command locus "L(t)" can be expressed by:

$$L(t)=(l2-l1)\sin 2\pi f2(t-t2)+l1$$

where f2<fx×0.9 or f2>fc×1.1. In this equation, "f2" represents a frequency component of a command locus. In addition, "l1" represents an interelectrode distance at a jump operation start point t1 and a jump operation end point t2, and "l2" represents the maximum value of an interelectrode distance in the jump operation. As the reference frequency fc, a resonance frequency of an electric discharge machining device (mechanical system) is used.

The equation of the interelectrode distance L(t) is stored in the machining condition storage unit 4. The jump locus generation unit 1 generates a command locus from the machining condition storage unit 4 on the basis of the equation of the interelectrode distance L(t), and the jump control unit 2 controls a jump operation on the basis of the command locus.

In the second embodiment, since the jump locus generation unit 1 generates a smooth command locus obtained by a sine wave of only a component of a frequency f2 except for frequencies ranging from a frequency which is 0.9 times the resonance frequency fc to a frequency which is 1.1 times the resonance frequency fc, a frequency f2 which is sufficiently different from the resonance frequency fc, vibration in a mechanical system does not remain upon completion of the jump operation, and precise machining can be performed.

In the second embodiment described above, the command locus is generated by a sine wave having only one frequency f2 except for frequencies ranging from the frequency which is 0.9 times the reference frequency fc to the frequency which is 1.1 times the reference frequency fc. However, a command locus including at least two frequency components which satisfy the condition may be generated.

In the second embodiment described above, the command locus is generated by only the frequency except for frequencies ranging from the frequency which is 0.9 times the reference frequency fc to the frequency which is 1.1 times the reference frequency fc. However, the command locus may be generated by only a frequency except for frequencies ranging from the frequency which is A times (0≦A<1) the reference frequency fc to the frequency which is B times (1≦B) the reference frequency fc.

In addition, although the resonance frequency of the mechanical system is used as the reference frequency fc, a cut-off frequency calculated by response of a control system or ½ of a sampling frequency of a digital controller may be used.

In the second embodiment described above, the jump operation is performed such that a command locus, i.e., the position of the interelectrode distance is controlled. However, the interelectrode distance may be controlled by speed control or acceleration control.

In the third embodiment, since a user can arbitrarily set and input the reference frequency fc or the like by using the machining condition input unit 14, vibration of a mechanical system upon completion of the jump operation is suppressed, and precise machining required by the user can be performed.

FIG. 4 is a block diagram showing the configuration of an electric discharge machining device according to the third embodiment of the present invention. In FIG. 4, the machining condition input unit 14 input jump operation condition information, i.e., parameters used in locus generation for a jump operation to a machining condition storage unit 4. For example, the reference frequency fc and the conditions such as "f<fc" are set and input.

In the first embodiment, since a user can arbitrarily set and input the reference frequency fc or the like by using the machining condition input unit 14, vibration of a mechanical system upon completion of the jump operation is suppressed, and precise machining required by the user can be performed.

A fourth embodiment of the present invention will be described below. The configuration of an electric discharge machining device according to the fourth embodiment is different from that of the electric discharge machining device shown in FIG. 1 in the equation of an interelectrode distance L(t) stored in a machining condition storage unit 4 and a generation process of a command locus performed by a jump locus generation unit 1, and the other configuration is the same as that of the electric discharge machining device shown in FIG. 1.

Figure 5:
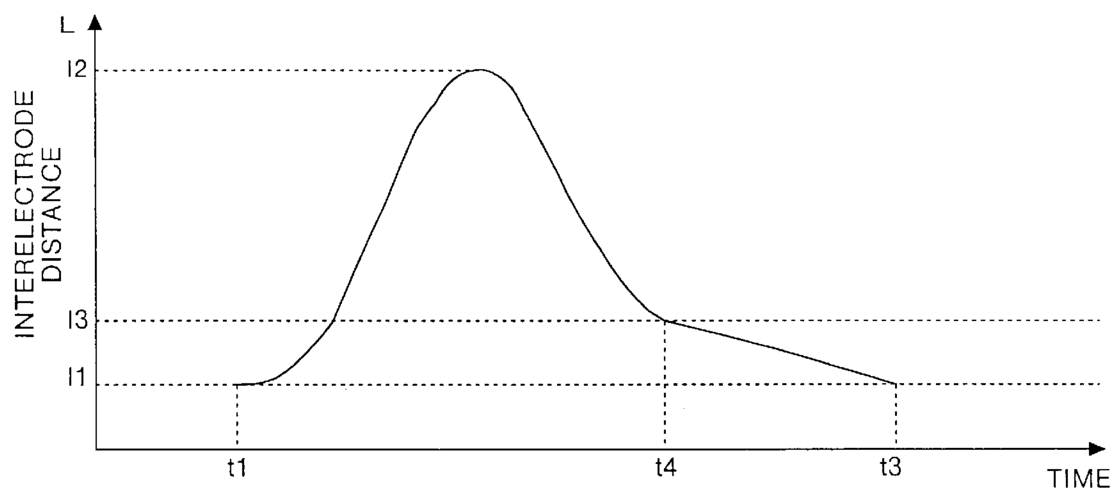
FIG. 5 is a graph showing an example of a command locus generated by a jump locus generation unit of an electric discharge machining device according to a fourth embodiment of the present invention.
Figure 6:
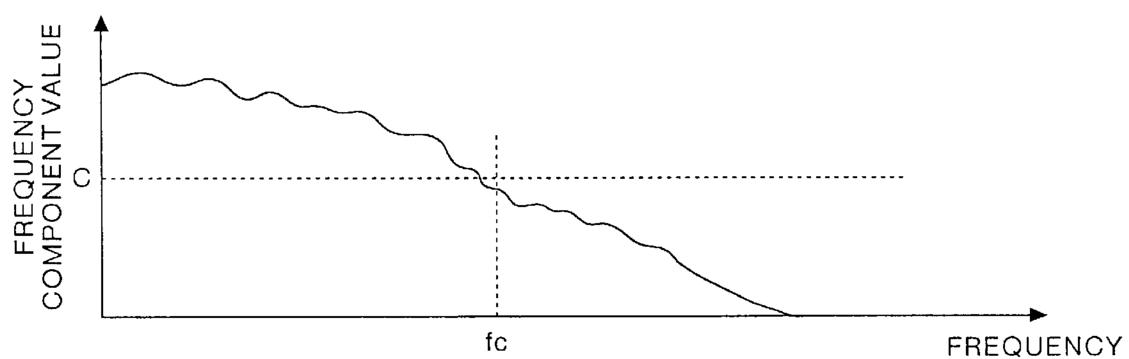
FIG. 6 is a graph showing a Fourier transform result shown in FIG. 5.

FIG. 5 is a graph showing a command locus of a jump operation generated by a jump locus generation unit of the electric discharge machining device according to the fourth embodiment of the present invention. FIG. 6 is a graph showing a Fourier transform result of the command locus shown in FIG. 5. The command locus shown in FIG. 5 is a locus which shapes an almost crest from a point of time t1 to a point of time t4. However, a distance from an interelectrode distance l3 at the point of time t4 to an interelectrode distance l1 at a point of time t3 upon completion of the jump operation is set as a deceleration distance (l3–l1).

On the other hand, the command locus shown in FIG. 5, as shown in FIG. 6, a frequency component value in a frequency range which is equal to or higher than the reference frequency (resonance frequency) fc is suppressed to a value which is equal to or smaller than a predetermined value C.

As a result, in the fourth embodiment, since a command locus in which the frequency component value in the frequency range which is equal to or higher than the resonance frequency fc is suppressed to the value which is equal to or smaller than the predetermined value C is generated, vibration does not remain upon completion of a jump operation, and precise machining can be performed. At the same time, the deceleration distance (l3–l1) can be shortened to reduce the vibration and to reduce an amount of overshooting. As a result, time required for the entire jump operation (t3–t1) can be shortened, and machining speed can be increased.

In the fourth embodiment described above, the resonance frequency of the mechanical system is used as the reference frequency fc. However, a cut-off frequency calculated by frequency response of a control system, ½ of a sampling frequency of a digital controller, or a reference frequency for setting these frequencies, e.g., a frequency which is A times ($0<A\leqq 1$) of the cut-off frequency may be used.

In the fourth embodiment described above, a jump operation is performed such that a command locus, i.e., the position of the interelectrode distance is controlled. However, the interelectrode distance may be controlled by speed control or acceleration control.

A fifth embodiment of the present invention will be described below. In the fourth embodiment described above, the command locus in which the frequency component value in the frequency range which is equal to or higher than the resonance frequency fc is equal to or smaller than the predetermined value C is generated. However, in this the fifth embodiment, a frequency component value in a frequency range from the frequency which is 0.9 times the resonance frequency fc to the frequency which is 1.1 times the resonance frequency fc is set to be equal to or smaller than the predetermined value C.

Figure 7:
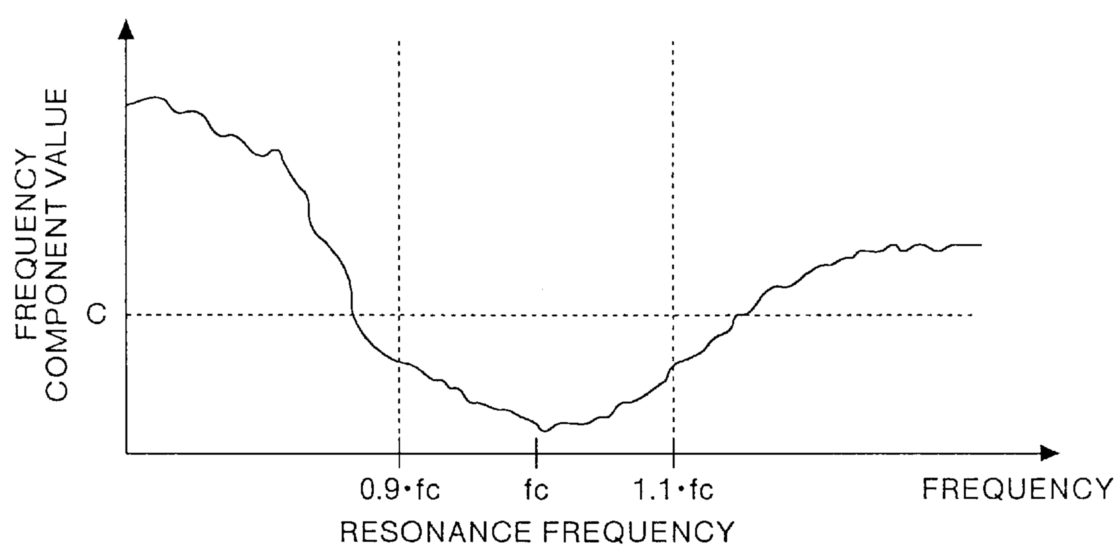
FIG. 7 is a graph showing an example of a Fourier transform result to a command locus generated by a jump locus generation unit of an electric discharge machining device according to a fifth embodiment of the present invention.

FIG. 7 is, for example, a graph showing an example of a Fourier transform result of a command locus which is approximate to that in FIG. 5. As shown in FIG. 7, in the fifth embodiment, a frequency component value in a frequency range from a frequency (0.9·fc) which is 0.9 times a resonance frequency fc to a frequency (1.1·fc) which is 1.1 times the resonance frequency fc is set to be equal to or smaller than a predetermined value C.

In this fifth embodiment, since a command locus in which a frequency component value approximate to a resonance frequency of a mechanical system is suppressed is generated, vibration of the mechanical system does not remain upon completion of a jump operation, and precise machining can be performed.

In the fifth embodiment described above, the resonance frequency of the mechanical system is used as the reference frequency fc. However, a cut-off frequency calculated by frequency response of a control system, ½ of a sampling frequency of a digital controller, or a reference frequency for setting these frequencies, e.g., a frequency which is A times ($0<A\leqq 1$) of the cut-off frequency may be used.

In the fifth embodiment described above, the command locus of the jump operation in which the frequency component value in the frequency range from the frequency which is 0.9 times the resonance frequency to the frequency which is 1.1 times the resonance frequency is suppressed to a value which is equal to or smaller than the predetermined value C is generated. However, the frequency component value in a frequency range from a frequency which is A times ($0<A\leqq 1$) the resonance frequency fc to a frequency which is B times ($1\leqq B$) the resonance frequency fc may be suppressed to a value which is equal to or smaller than the predetermined value C.

In addition, in the fifth embodiment described above, although the jump operation is performed such that the command locus, i.e., the position of the interelectrode distance is controlled. However, the interelectrode distance may be controlled by speed control or acceleration control.

A sixth embodiment of the present invention will be described below. In both the fourth embodiment and the fifth embodiment described above, the jump generation units 1 generate the command loci in which the frequency component values in the frequency ranges are suppressed to the value which is equal to or smaller than the predetermined value C. In the sixth embodiment, on an output stage of a jump control unit 2, a filter 15 which suppresses the frequency component value in the frequency range which is equal to or higher than the resonance frequency fc to a value which is equal to or larger than the predetermined value C.

Figure 8:
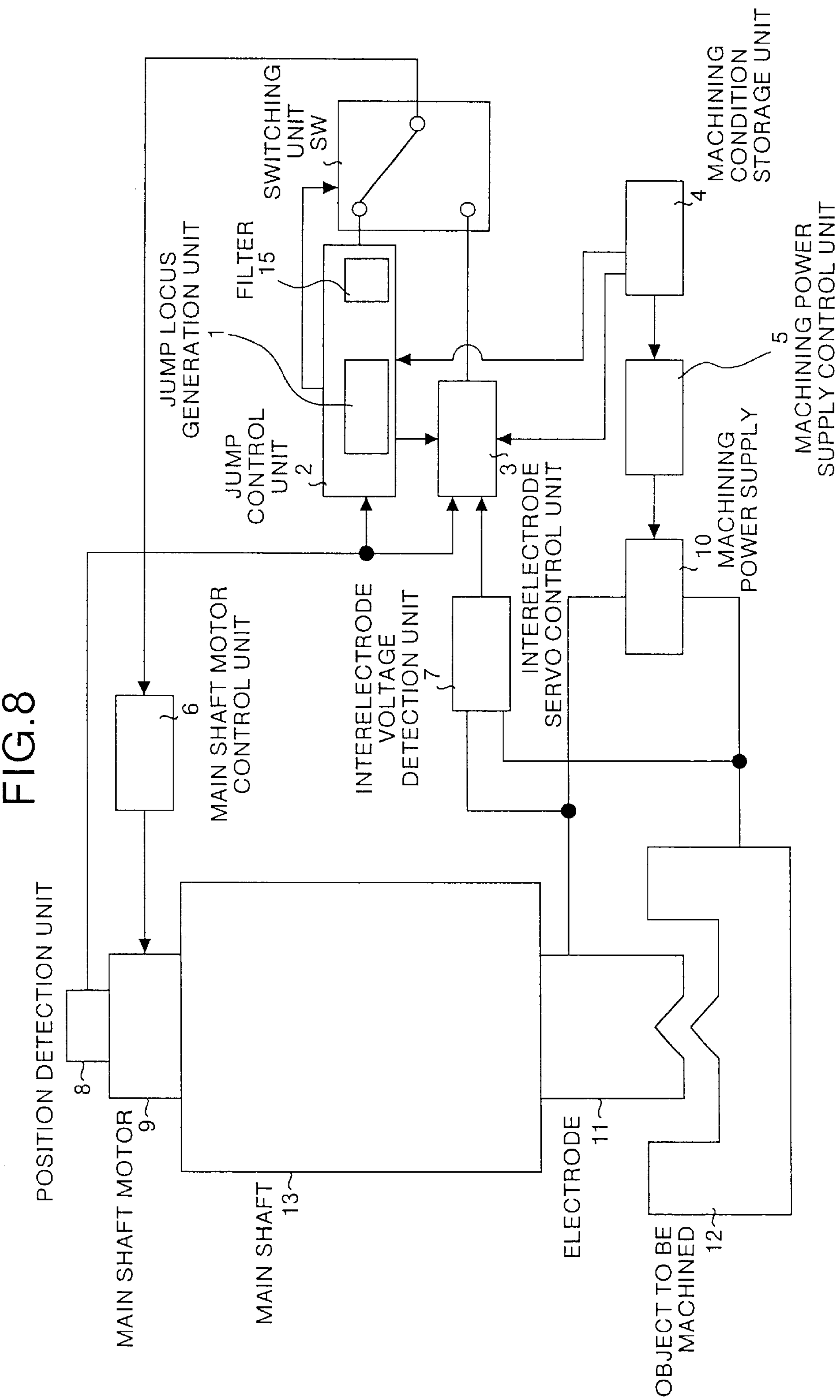
FIG. 8 is a block diagram showing the configuration of an electric discharge machining device according to a sixth embodiment of the present invention.

FIG. 8 is a block diagram showing the configuration of an electric discharge machining device according to the sixth embodiment of the present invention. In FIG. 8, the filter 15 is an analog filter outputs a frequency component value in a frequency range which is equal to or higher than the resonance frequency fc such that the frequency component value is suppressed to a value which is equal to or smaller than the predetermined value C. The other configuration is the same as the configuration of the electric discharge machining device shown in FIG. 1.

In this sixth embodiment, the filter 15 realized by an analog filter is arranged on the output stage of the jump control unit 2, so that the frequency component value in the frequency range which is equal to or higher than the resonance frequency fc is suppressed to the value which is equal to or smaller than the predetermined value C. For this reason, vibration of a mechanical system does not remain upon completion of a jump operation, and precise machining can be performed. In addition, since vibration is small, or since an amount of overshooting is small, a deceleration distance (l3–l1) can be shortened. Entire jump operation time (t3–t1) can be shortened, and machining speed can be increased.

In the sixth embodiment described above, by using the analog filter, the frequency component value in the frequency range which is equal to or higher than the resonance frequency fc is suppressed to the value which is equal to or smaller than the predetermined value C. However, a digital filter may be incorporated in the jump locus generation unit 1 to generate a smooth command locus in which a frequency component value in a frequency range which is equal to or higher than the resonance frequency fc is suppressed to a value which is equal to or smaller than the predetermined value C.

In the sixth embodiment described above, the jump operation is performed such that a command locus, i.e., the position of the interelectrode distance is controlled. However, the interelectrode distance may be controlled by speed control or acceleration control.

A seventh embodiment of the present invention will be described below. In this seventh embodiment, one command locus is generated by using a plurality of loci.

Figure 9A:
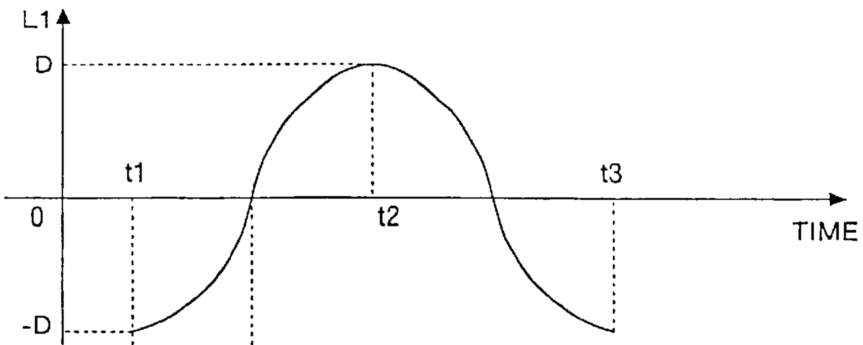
FIGS. 9(*a*)–9(*c*) are graphs showing an example of a command locus generated by a jump locus generation unit of an electric discharge machining device according to a seventh embodiment of the present invention.
Figure 9B:
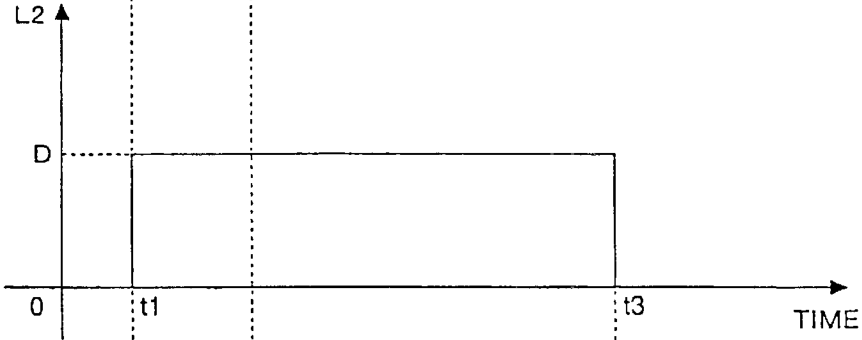
Figure 9C:
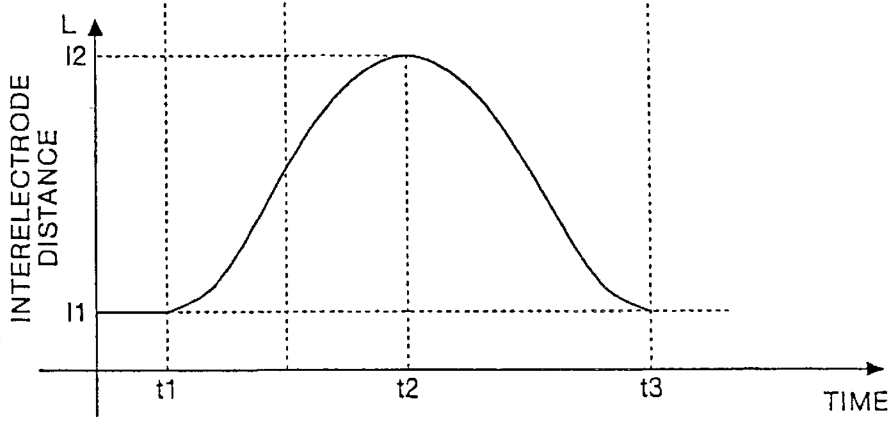

FIGS. 9(*a*)–9(*c*) are graphs for explaining an example of a command locus generation process of a jump operation performed by a jump locus generation unit 1 of an electric discharge machining device according to the seventh embodiment of the present invention. Using a sine wave L1(t) shown in FIG. 9(*a*) and a rectangular wave L2(t) shown in FIG. 9(*b*), a command locus L(t) shown in FIG. 9(*c*) is generated. More specifically, the command locus L(t) can be expressed as:

$$L(t)=L1(t)+L2(t).$$

In this equation, the sine wave L1(t) is a sine wave having a frequency component which is lower than a set frequency, i.e., a resonance frequency fc. Therefore, in the sine wave L1(t), a frequency component value in the frequency range which is equal to or higher than the resonance frequency fc is 0.

On the other hand, the rectangular wave L2(t) can be expressed by the following equation:

$$L2(t) = 0\ (t < t1)$$

$$D(t1 \le t \le t3)$$

$$0(t3 < t).$$

This rectangular wave L2(t) is subjected to Fourier series development, the following equation can be obtained:

$$L2(t) = (4D/\pi)\sum_{m=0}^{\infty}(1/(2m+1)$$

$$\cdot\sin(2(2m+1)\pi/(t3-t1))(t-t1)).$$

When the size of a frequency component value of a frequency f[Hz] is calculated, the following value is obtained:

$$4D/\pi f(t3-t1).$$

Since the frequency component value decreases as the frequency f increases, a value "D" is sufficiently decreased such that the frequency component value of the resonance frequency fc is equal to or smaller than the predetermined value C, or a time value (t3–t1) is increased, so that the frequency component value in an entire frequency range in which the frequency f is equal to or higher than the resonance frequency fc is equal to or smaller than the predetermined value C.

The command locus L(t) of the jump operation is a function of these values, i.e., the sum of the sine wave L1(t) and the rectangular wave L2(t). For this reason, the frequency component value in the frequency range which is higher than the resonance frequency fc can be set to be equal to or smaller than the predetermined value C.

In the seventh embodiment, in consideration of frequency component values of functions of respective loci, a command locus of a jump operation in which the sum of the frequency component values in the frequency range which is higher than the resonance frequency fc is equal to or smaller than the predetermined value C is generated. For this reason, upon completion of the jump operation, vibration of a mechanical system does not remain, and precise machining can be performed.

In the seventh embodiment described above, the command locus L(t) is generated by the sum of the sine wave L1(t) and the rectangular wave L2(t). However, two or more sine waves L1(t) and two or more rectangular waves L2(t) may be added. Moreover, two or more sine waves L1(t) or two or more rectangular waves L2(t) may be added to generate a command locus L(t). In addition, a function of another locus, i.e., a chopping wave may be added to generate a command locus.

In the seventh embodiment described above, the command locus is calculated as the sum of only functions defined in an entire time range from a jump operation start point t1 to a jump operation end point t3. However, the time range is divided, and command loci are generated for the respective time ranges, so that a locus obtained by connecting these time ranges may be obtained as the command locus.

For example, as shown in FIGS. 10(*a*)–10(*d*), by using functions L11(t) and L21(t) in which only time ranges (t1<t4<t3) from a point of time t1 to a point of time t4 are defined and functions L12(t) and L22(t) in which only time ranges from the point of time t4 to a point of time t3 are defined, the sum of the function L11(t) and the function L21(t) may be set to satisfy conditions under which the frequency component value in the frequency range is equal to or smaller than the predetermined value in the time range from the point of time t1 to the point of time t4, and the sum of the function L12(t) and the function L22(t) may be set to satisfy conditions under which the frequency component value in the frequency range is equal to or smaller than the predetermined value in the time range from the point of time t4 to the point of time t3. In this case, the time range may be divided into a more large number of time ranges. For example, the time range may be divided into three or more time ranges, and a command locus may be calculated by the sum of loci of respective time ranges.

In the seventh embodiment described above, the jump operation is performed such that a command locus, i.e., the position of the interelectrode distance is controlled. However, the interelectrode distance may be controlled by speed control or acceleration control.

A eighth embodiment of the present invention will be described below. In this eighth embodiment, a jump control unit 2 evaluates an operation state of a jump operation, and a command locus is automatically set again such that an appropriate jump operation is performed on the basis of the evaluation result.

FIG. 11 is a block diagram showing the configuration of an electric discharge machining device according to the eighth embodiment of the present invention. This electric discharge machining device is different from the electric discharge machining device shown in FIG. 1 in the configuration of the jump control unit 2, and the other configuration of the electric discharge machining device in FIG. 11 is the same as that of the electric discharge machining device shown in FIG. 1.

In FIG. 11, the jump control unit 2 has an evaluation unit 21 and a setting change unit 22. The evaluation unit 21 to cause a jump locus generation unit 1 to generate a command locus based on jump operation condition information stored in the machining condition storage unit 4, and a jump operation is executed on the basis of the command locus. When the jump operation is executed with vibration, the evaluation unit 21 instructs the setting change unit 22 to set a command locus for decreasing a resonance frequency fc or decreasing an allowable vibration amount (predetermined value C).

The setting change unit 22 stores this instruction in the machining condition storage unit 4. More specifically, the setting of the jump operation condition information in the machining condition storage unit 4 is automatically changed. By the setting change, a jump operation is executed by a command locus using the jump operation condition information which is subjected to setting change, i.e., which is corrected in the next jump operation.

In this eighth embodiment, an actual motion of a main shaft 13 (electrode 11) is evaluated, and settings of the conditions such as a resonance frequency fc and the allowable vibration amount (predetermined value C) are changed. For this reason, machining conditions are automatically optimized, and machining can be performed at a high speed and a high precision.

In the eighth embodiment described above, the command locus of the jump operation which is subjected to setting change in the jump operation next to the jump operation evaluated by the evaluation unit 21 is applied. However, for example, after setting change is performed, the command locus which is subjected to the setting change may be applied from the second or subsequent jump operation.

A ninth embodiment of the present invention will be described below. In the ninth embodiment, in consideration of frequency component values of functions of accelerations, an acceleration locus is subjected to second-order integration such that the sum of frequency component values in a frequency range which is higher than a resonance frequency fc is equal to or smaller than a predetermined value C, so that a command locus is generated.

Figures 12A, 12B, 12C:
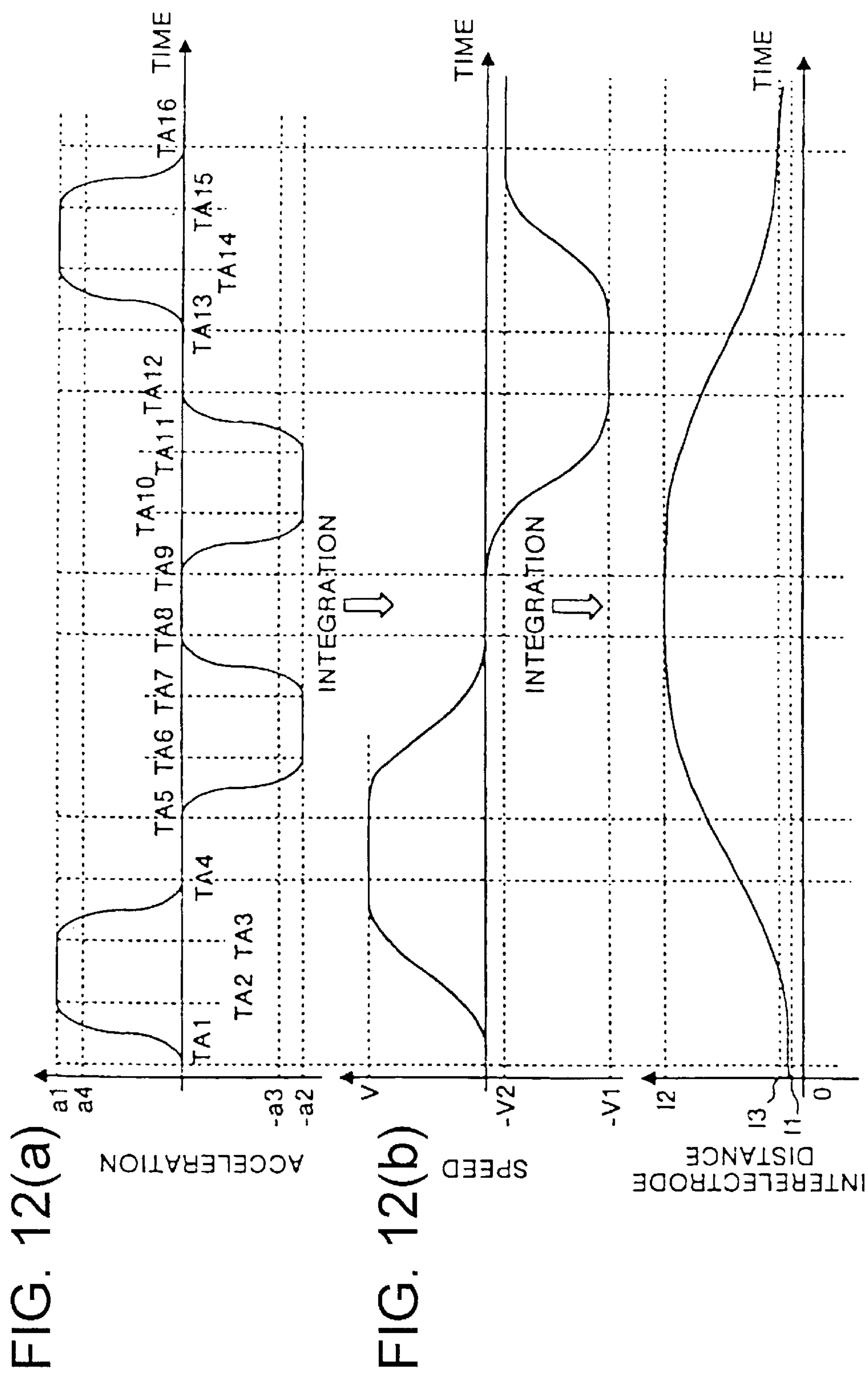
FIGS. 12(*a*)–12(*c*) are graphs showing an example of a command locus generated by a jump locus generation unit which is a ninth embodiment of the present invention.

FIGS. 12(*a*)–12(*c*) are graphs showing an example of a generation process of a command locus generated by a jump locus generation unit 1 of an electric discharge machining device according to the ninth embodiment of the present invention. As shown in FIG. 12(*a*), an acceleration locus is determined. More specifically, in respective sections between a point of time TA1 and a point of time TA16, the following acceleration loci are determined.

$TA1 \leqq t < TA2$:
$$a(t) = a1/2(1 - \cos(2\pi f1(t - TA1)))$$
$$\text{where } f1 = 1/(2(TA2 - TA1))$$
$TA2 \leqq t \leqq TA3$:
$$a(t) = a1$$
$TA3 < t < TA4$:
$$a(t) = a1/2(1 + \cos(2\pi f2(t - TA3)))$$
$$\text{where } f2 = 1/(2(TA4 - TA3))$$
$TA4 \leqq t \leqq TA5$:
$$a(t) = 0$$
$TA5 < t < TA6$:
$$a(t) = a2/2(-1 + \cos(2\pi f3(t - TA5)))$$
$$\text{where } f3 = 1/(2(TA6 - TA5))$$
$TA6 \leqq t \leqq TA7$:
$$a(t) = -a2$$
$TA7 < t < TA8$:
$$a(t) = a2/2(-1 - \cos(2\pi f4(t - TA7)))$$
$$\text{where } f4 = 1/(2(TA8 - TA7))$$
$TA8 \leqq t \leqq TA9$:
$$a(t) = 0$$
$TA9 < t < TA10$:
$$a(t) = a3/2(-1 + \cos(2\pi f5(t - TA9)))$$
$$\text{where } f5 = 1/(2(TA6 - TA5))$$
$TA10 \leqq t \leqq TA11$:
$$a(t) = -a3$$
$TA11 < t < TA12$:
$$a(t) = a3/2(-1 - \cos(2\pi f6(t - TA11)))$$
$$\text{where } f6 = 1/(2(TA12 - TA11))$$
$TA12 \leqq t \leqq TA13$:
$$a(t) = 0$$
$TA13 < t < TA14$:
$$a(t) = a4/2(1 - \cos(2\pi f7(t - TA13)))$$
$$\text{where } f7 = 1/(2(TA14 - TA13))$$
$TA14 \leqq t \leqq TA15$:
$$a(t) = a4$$
$TA15 < t < TA16$:
$$a(t) = a4/2(1 + \cos(2\pi f8(t - TA15)))$$
$$\text{where } f8 = 1/(2(TA16 - TA15))$$

In this case, a frequency fi (i=1, 2, . . . , 8) of the sine wave part is set to be lower than the resonance frequency fc.

Figure 13:
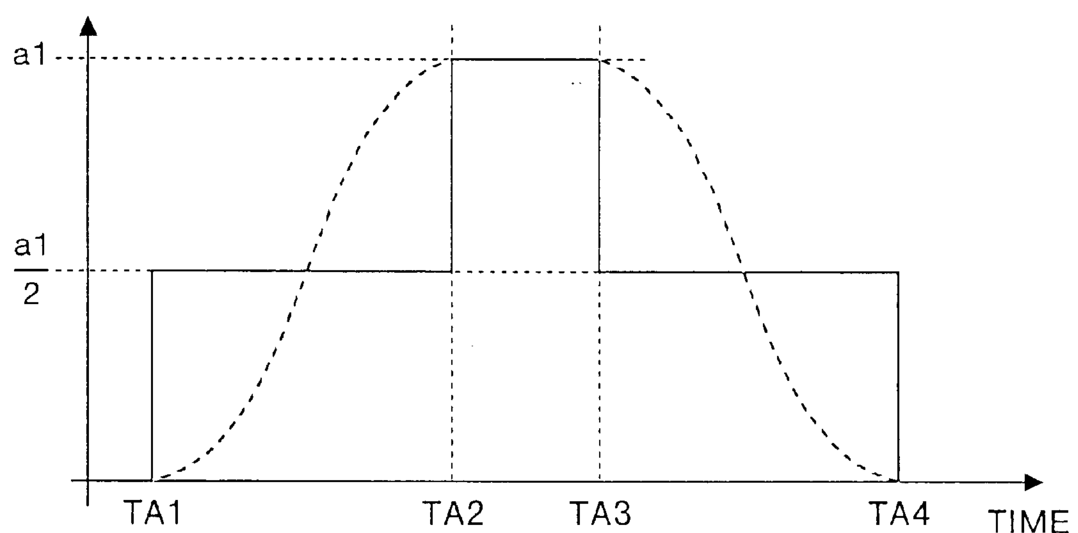
FIG. 13 is a graph showing an example of a decomposition waveform of a partial waveform of FIG. 12(*a*)
Figure 14:
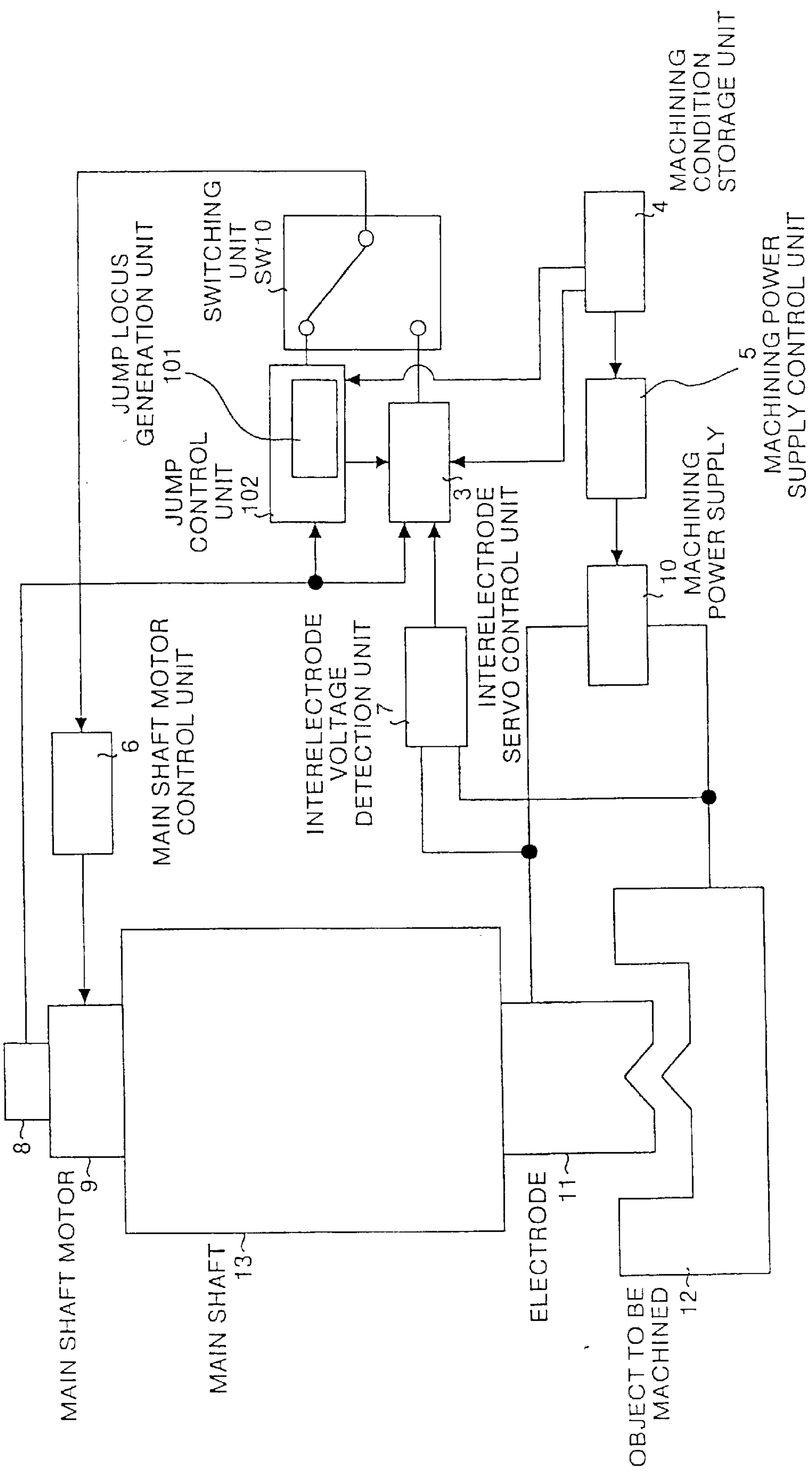
FIG. 14 is a block diagram showing the configuration of a conventional electric discharge machining device.
Figure 15A:
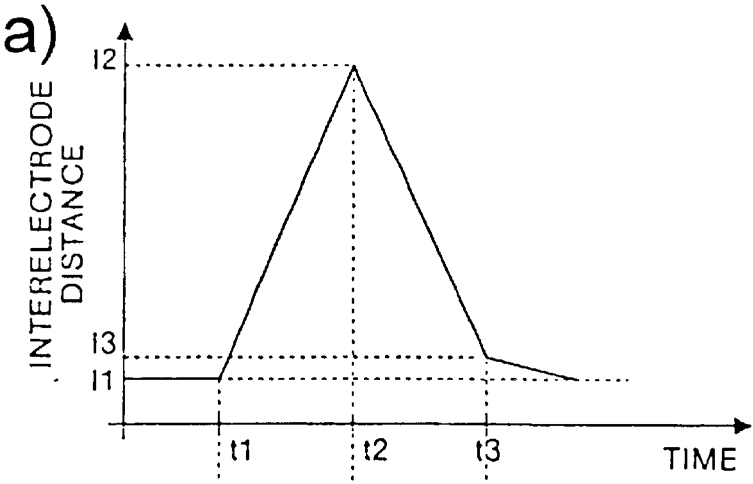
FIGS. 15(*a*)–15(*d*) are graphs for explaining a jump operation performed by the conventional electric discharge machining device.
Figure 15B:
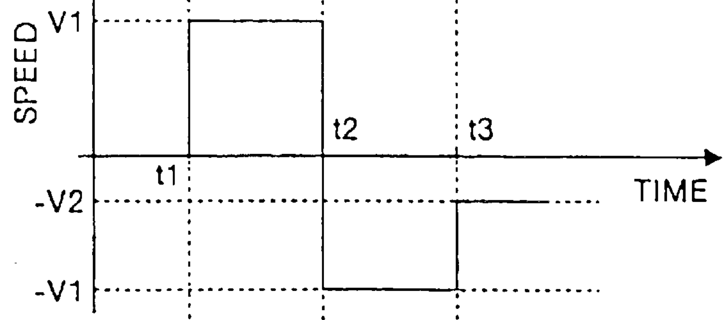
Figure 15C:
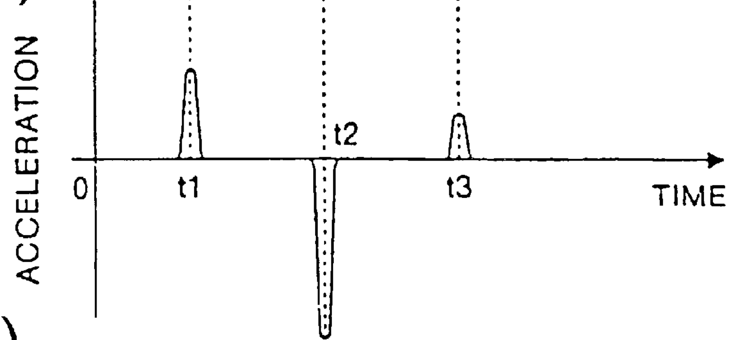
Figure 15D:
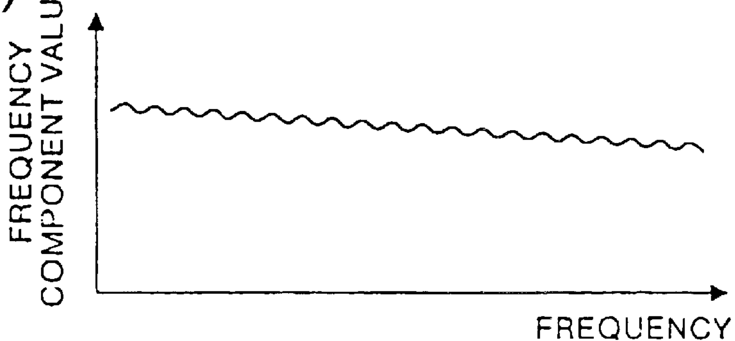

It is assumed that the waveform of the acceleration locus in the section represented by TA1<t≦TA4 includes a rectangular wave indicated by a solid line in FIG. 13. This rectangular wave is the sum of two rectangular waves defined by:

height: a1/2, width: TA4 − TA1
and
height: a1/2, width: TA3 − TA2.

For this reason, a value "a1" is decreased, or a time interval is lengthened such that a frequency component value expressed by:

$$2a1/\pi f(TA4-TA1)+2a1/\pi f(TA3-TA2)$$

at the frequency f is equal to or smaller than the predetermined value C.

Similarly, in the respective sections represented by TA5<t<TA8, TA9<t<TA12, and TA13<t<TA16, frequency components at the frequency f are set to be equal to or smaller than the predetermined value C, and an acceleration function is determined such that a maximum interelectrode distance 12, a maximum speed V1, a deceleration distance l2, a speed −V2 in a deceleration distance reach state satisfy conditions, respectively.

More specifically, a speed locus in FIG. 12(*b*) obtained by performing first-order integration to an acceleration locus shown in FIG. 12(*a*) is calculated, and a command locus shown in FIG. 12(*c*) obtained by further integrating the speed locus shown in FIG. 12(*b*), i.e., by performing second-order integration to the acceleration locus in FIG. 12(*a*) is finally calculated.

In this ninth embodiment, in consideration of the frequency components of respective functions of an acceleration, the acceleration locus is subjected to second-order integration such that the sum of frequency component values in a frequency range which is higher than the resonance frequency fc is equal to or smaller than the predetermined value C, so that a command locus is generated. For this reason, vibration of a mechanical system does not remain upon completion of the jump operation, and precise machining can be performed. Since vibration is small, and since an amount of overshooting is small, a deceleration distance (l3−l1) can be shortened. Entire jump operation time (t3−t1) can be shortened, and machining speed can be increased.

In the ninth embodiment described above, the command locus of the jump operation is generated such that the acceleration locus satisfies the condition, and the acceleration locus is subjected to second-order integration to calculate a command value an interelectrode distance, i.e., a command locus. However, the jump control unit 2 may perform speed control or acceleration control based on the speed locus or the acceleration locus in place of the command locus.

In addition, in generation of the command locus, a second-order integration process is performed. However, only a first-order or a third-or-higher-order integration process may be performed. A first-or-higher-order differential process may be performed to calculate a desired command locus, a speed locus, and an acceleration locus.

INDUSTRIAL APPLICABILITY

This invention can be used in an electric discharge machining device and an electric discharge machining method which a voltage is applied across an electrode and an object to machine the object by using an electric discharge phenomenon generated between both the electrodes and, more particularly, is preferably applied to an electric discharge machining device and an electric discharge machining method for controlling a jump operation for temporarily increasing an interelectrode distance every predetermined time or depending on a machining state.

What is claimed is:

1. An electric discharge machining device comprising:

an interelectrode servo control unit which controls an interelectrode distance between an electrode and an object while applying a voltage across the electrode and the object; and a jump control unit which controls a jump operation in which the interelectrode distance is temporarily increased at one of (i) time intervals and (ii) in response to a machining state, wherein the jump control unit includes a command locus generation unit which generates a smooth command locus having a frequency component in a frequency range, and controls the jump operation using the smooth command locus generated by the command locus generation unit.

2. The electric discharge machining device according to claim 1, comprising a storage unit which stores condition information of the jump operation including one of (i) the frequency range and (ii) the frequency range and a value, wherein the command locus generation unit generates the smooth command locus based on one of (i) the frequency range and (ii) the frequency range and the value.

3. The electric discharge machining device according to claim 2, comprising a setting input unit which receives one of (i) the frequency range and (ii) at least one of the frequency range and the value, wherein the command locus generation unit generates the smooth command locus based on one of (i) the frequency range and (ii) the frequency and the value set by the setting input unit.

4. The electric discharge machining device according to claim 2, wherein the jump control unit includes a jump operation evaluation unit which detects a state in the jump operation to evaluate the jump operation; and a setting change unit which changes one of (i) the frequency range, (ii) the value, and (iii) the frequency range and the value based on an evaluation by the jump operation evaluation unit.

5. The electric discharge machining device according to claim 2, wherein the command locus generation unit generates a function which satisfies one of (i) the frequency range and (ii) the frequency range and the value and which corresponds to the jump operation, and performs one of (i) at least one integrating process and (ii) at least one differential process on the function to generate one of (i) the smooth command locus and (ii) a control command corresponding to the smooth command locus.

6. The electric discharge machining device according to claim 1, wherein the jump control unit controls the jump operation based on one of (i) a command speed and (ii) a command acceleration corresponding to the smooth command locus.

7. An electric discharge machining device comprising:

an interelectrode servo control unit which controls an interelectrode distance between an electrode and an object while applying a voltage across the electrode and the object; and a jump control unit which controls a jump operation in which the interelectrode distance is temporarily increased at one of (i) time intervals and (ii) in response to a machining state, wherein the jump control unit includes a command locus generation unit which generates a smooth command locus having a frequency component in a frequency range except for a frequency range from a first frequency, which is lower than a second frequency, to a third frequency, which is higher than the second frequency, and controls the jump operation using the smooth command locus generated by the command locus generation unit.

8. The electric discharge machining device according to claim 7, comprising a storage unit which stores condition information of the jump operation including one of (i) the frequency range and (ii) the frequency range and a value, wherein the command locus generation unit generates the smooth command locus based on one of (i) the frequency range and (ii) the frequency range and the value.

9. The electric discharge machining device according to claim 8, comprising a setting input unit which receives one of (i) the frequency range and (ii) at least one of the frequency range and the value, wherein the command locus generation unit generates the smooth command locus based on one of (i) the frequency range and (ii) the frequency and the value set by the setting input unit.

10. The electric discharge machining device according to claim 8, wherein the jump control unit includes a jump operation evaluation unit which detects a state in the jump operation to evaluate the jump operation; and a setting change unit which changes one of (i) the frequency range, (ii) the value, and (iii) the frequency range and the value based on an evaluation by the jump operation evaluation unit.

11. The electric discharge machining device according to claim 8, wherein the command locus generation unit generates a function which satisfies one of (i) the frequency range and (ii) the frequency range and the value and which corresponds to the jump operation, and performs one of (i) at least one integrating process and (ii) at least one differential process on the function to generate one of (i) the smooth command locus and (ii) a control command corresponding to the smooth command locus.

12. The electric discharge machining device according to claim 7, wherein the jump control unit controls the jump operation based on one of (i) a command speed and (ii) a command acceleration corresponding to the smooth command locus.

13. An electric discharge machining device comprising:

an interelectrode servo control unit which controls an interelectrode distance between an electrode and an object while applying a voltage across the electrode and the object; and a jump control unit which controls a jump operation in which the interelectrode distance is temporarily increased at one of (i) time intervals and (ii) in response to a machining state, wherein the jump control unit includes a command locus generation unit which generates a smooth command locus having a frequency component in a frequency range suppressed to a first value, and controls the jump operation using the smooth command locus generated by the command locus generation unit.

14. The electric discharge machining device according to claim 13, wherein the jump control unit includes a filter shaping a locus into a smooth command locus having the frequency component suppressed to the first value.

15. The electric discharge machining device according to claim 13, wherein the command locus generation unit adds a plurality of loci, each locus having a frequency component suppressed to a second value to generate the smooth command locus having the frequency component suppressed to the first value.

16. The electric discharge machining device according to claim 13, comprising a storage unit which stores condition information of the jump operation including one of (i) the frequency range and (ii) the frequency range and a first value, wherein the command locus generation unit generates the smooth command locus based on one of (i) the frequency range and (ii) the frequency range and the first value.

17. The electric discharge machining device according to claim 13, comprising a setting input unit which receives one of (i) the frequency range and (ii) at least one of the frequency range and the first value, wherein the command locus generation unit generates the smooth command locus based on one of (i) the frequency range and (ii) the frequency and the first value set by the setting input unit.

18. The electric discharge machining device according to claim 13, wherein the jump control unit includes a jump operation evaluation unit which detects a state in the jump operation to evaluate the jump operation; and a setting change unit which changes one of (i) the frequency range, (ii) the first value, and (iii) the frequency range and the first value based on an evaluation by the jump operation evaluation unit.

19. The electric discharge machining device according to claim 13, wherein the command locus generation unit generates a function which satisfies one of (i) the frequency range and (ii) the frequency range and the first value and which corresponds to the jump operation, and performs one of (i) at least one integrating process and (ii) at least one differential process on the function to generate one of (i) the smooth command locus and (ii) a control command corresponding to the smooth command locus.

20. The electric discharge machining device according to claim 13, wherein the jump control unit controls the jump operation based on one of (i) a command speed and (ii) a command acceleration corresponding to the smooth command locus.

21. An electric discharge machining device comprising:

an interelectrode servo control unit which controls an interelectrode distance between an electrode and an object while applying a voltage across the electrode and the object; and a jump control unit which controls a jump operation in which the interelectrode distance is temporarily increased at one of (i) time intervals and (ii) in response to a machining state, wherein the jump control unit includes a command locus generation unit which generates a smooth command locus having a frequency component in a frequency range from a first frequency, which is lower than a second frequency, to a third frequency, which is higher than the second frequency, suppressed to a first value, and controls the jump operation using the smooth command locus generated by the command locus generation unit.

22. The electric discharge machining device according to claim 21, wherein the jump control unit includes a filter shaping a locus into a smooth locus having the frequency component suppressed to the first value.

23. The electric discharge machining device according to claim 21, wherein the command locus generation unit adds a plurality of loci, each locus having a frequency component suppressed to a second value, to generate the smooth command locus having the frequency component suppressed to the first value.

24. The electric discharge machining device according to claim 21, comprising a storage unit which stores condition information of the jump operation including one of (i) the frequency range and (ii) the frequency range and the first value, wherein the command locus generation unit generates the smooth command locus based on one of (i) the frequency range and (ii) the frequency range and the first value.

25. The electric discharge machining device according to claim 21, comprising a setting input unit which receives one of (i) the frequency range and (ii) at least one of the frequency range and the first value, wherein the command locus generation unit generates the smooth command locus based on one of (i) the frequency range and (ii) the frequency and the first value set by the setting input unit.

26. The electric discharge machining device according to claim 21, wherein the jump control unit includes a jump operation evaluation unit which detects a state in the jump operation to evaluate the jump operation; and a setting change unit which changes one of (i) the frequency range, (ii) the first value, and (iii) the frequency range and the first value based on an evaluation by the jump operation evaluation unit.

27. The electric discharge machining device according to claim 21, wherein the command locus generation unit generates a function which satisfies one of (i) the frequency range and (ii) the frequency range and the first value and which corresponds to the jump operation, and performs one of (i) at least one integrating process and (ii) at least one differential process on the function to generate one of (i) the command locus and (ii) a control command corresponding to the command locus.

28. The electric discharge machining device according to claim 21, wherein the jump control unit controls the jump operation based on one of (i) a command speed and (ii) a command acceleration corresponding to the smooth command locus.

29. An electric discharge machining method in which an interelectrode servo control unit controls an interelectrode distance between an electrode and an object while applying a voltage across the electrode and the object, and a jump control unit controls a jump operation that temporarily increases the interelectrode distance at one of (i) time intervals and (ii) in response to a machining state, the method comprising:

generating a smooth command locus having a frequency component in a frequency range; and controlling the jump operation using the smooth command locus generated.

30. The electric discharge machining method according to claim 29, comprising inputting a setting of one of (i) the frequency range and (ii) the frequency range and a value, and generating the smooth command locus based on one of (i) the frequency range and (ii) the frequency range and the predetermined value.

31. The electric discharge machining method according to claim 30, comprising:

detecting a state in the jump operation to evaluate the jump operation; and changing a setting of one of (i) the frequency range, (ii) the value, and (iii) the frequency range and the value based on evaluation of the jump operation.

32. The electric discharge machining method according to claim 30, including, in generating the smooth command locus, generating a function which satisfies one of (i) the frequency range and (ii) the frequency range and the value and which corresponds to the jump operation, and performing one of (i) at least one integrating process and (ii) at least one differentiating process on the function to generate one of the smooth command locus and a control command corresponding to the smooth command locus.

33. The electric discharge machining method according to claim 29, including controlling the jump operation based on one of (i) a command speed and a command acceleration corresponding to the smooth command locus.

34. An electric discharge machining method in which an interelectrode servo control unit controls an interelectrode distance between an electrode and an object while applying a voltage across the electrode and the object, and a jump control unit controls a jump operation that temporarily increases the interelectrode distance at one of (i) time intervals and (ii) in response to a machining state, the method comprising:

generating a smooth command locus having a frequency component in a frequency range, except in a frequency range from a first frequency, which is lower than a second frequency, to a third frequency, which is higher than the second frequency; and controlling the jump operation using the smooth command locus generated.

35. The electric discharge machining method according to claim 34, comprising inputting a setting of one of (i) the frequency range and (ii) the frequency range and a value, wherein the smooth command locus is generated based on one of (i) the frequency range and (ii) the frequency range and the value.

36. The electric discharge machining method according to claim 35, comprising:

detecting a state in the jump operation to evaluate the jump operation; and changing a setting of one of (i) the frequency range, (ii) the value, and (iii) the frequency range and the value based on evaluation of the jump operation.

37. The electric discharge machining method according to claim 35, including, in generating the smooth command locus, generating a function which satisfies one of (i) the frequency range and (ii) the frequency range and the value and which corresponds to the jump operation, and performing one of (i) at least one integrating process and (ii) at least one differentiating process on the function to generate one of the smooth command locus and a control command corresponding to the smooth command locus.

38. The electric discharge machining method according to claim 34, including controlling the jump operation based on one of (i) a command speed and a command acceleration corresponding to the smooth command locus.

39. An electric discharge machining method in which an interelectrode servo control unit controls an interelectrode distance between an electrode and an object while applying a voltage across the electrode and the object, and a jump control unit controls a jump operation that temporarily increases the interelectrode distance at one of (i) time intervals and (ii) in response to a machining state, the method comprising:

generating a smooth command locus having a frequency component in a frequency range suppressed to a first value; and controlling the jump operation using the smooth command locus generated.

40. The electric discharge machining method according to claim 39, wherein generating the command locus includes adding a plurality of loci, each locus having a frequency component suppressed to a second value; and generating the smooth command locus with the frequency component suppressed to the first value, based on the loci added.

41. The electric discharge machining method according to claim 39, comprising inputting a setting of one of (i) the frequency range and (ii) the frequency range and a third value, including generating the smooth command locus based on one of (i) the frequency range and (ii) the frequency range and the third value.

42. The electric discharge machining method according to claim 41, comprising:

detecting a state in the jump operation to evaluate the jump operation; and changing a setting of one of (i) the frequency range, (ii) the third value, and (iii) the frequency range and the third value based on evaluation of the jump operation.

43. The electric discharge machining method according to claim 41, including, in generating a smooth command locus, generating a function which satisfies one of (i) the frequency range and (ii) the frequency range and the third value and which corresponds to the jump operation, and performing one of (i) at least one integrating process and (ii) at least one differentiating process on the function to generate one of the smooth command locus and a control command corresponding to the smooth command locus.

44. The electric discharge machining method according to claim 39, including controlling the jump operation based on one of (i) a command speed and a command acceleration corresponding to the smooth command locus.

45. An electric discharge machining method in which an interelectrode servo control unit controls an interelectrode distance between an electrode and an object while applying a voltage across the electrode and the object, and a jump control unit controls a jump operation that temporarily increases the interelectrode distance at one of (i) time intervals and (ii) in response to a machining state, the method comprising:

generating a smooth command locus having a frequency component in a frequency range from a first frequency, which is lower than a second frequency, to a third frequency, which is higher than the second frequency, suppressed to a first value; and controlling the jump operation using the smooth command locus generated.

46. The electric discharge machining method according to claim 45, wherein generating the command locus includes adding a plurality of loci, each locus having a frequency component suppressed to a second value; and generating the smooth command locus including the frequency component suppressed to the first value, based on the loci added.

47. The electric discharge machining method according to claim 45, comprising inputting a setting of one of (i) the frequency range and (ii) the frequency range and a third value, including generating the smooth command locus based on one of (i) the frequency range and (ii) the frequency range and the third value.

48. The electric discharge machining method according to claim 47, further comprising:

detecting a state in the jump operation to evaluate the jump operation; and changing a setting of one of (i) the frequency range, (ii) the third value, and (iii) the frequency range and the third value based on evaluation of the jump operation.

49. The electric discharge machining method according to claim 47, including, in generating a smooth command locus, generating a function which satisfies one of (i) the frequency range and (ii) the frequency range and the third value and which corresponds to the jump operation, and performing one of (i) at least one integrating process and (ii) at least one differentiating process on the function to generate one of the smooth command locus and a control command corresponding to the smooth command locus.

50. The electric discharge machining method according to claim 45, including controlling the jump operation based on one of (i) a command speed and a command acceleration corresponding to the smooth command locus.

* * * * *